US012249221B2

(12) United States Patent
Carlson et al.

(10) Patent No.: US 12,249,221 B2
(45) Date of Patent: *Mar. 11, 2025

(54) LOCALIZED BETTING SYSTEM AND METHOD

(71) Applicant: NAGRAVISION SARL, Cheseaux-sur-Lausanne (CH)

(72) Inventors: Scott Carlson, Cheseaux-sur-Lausanne (CH); José-Emmanuel Pont, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/223,066

(22) Filed: Jul. 18, 2023

(65) Prior Publication Data

US 2024/0021053 A1 Jan. 18, 2024

Related U.S. Application Data

(63) Continuation of application No. 17/396,440, filed on Aug. 6, 2021, now Pat. No. 11,749,066.

(30) Foreign Application Priority Data

Aug. 14, 2020 (EP) .................................... 20191202

(51) Int. Cl.
*G07F 17/32* (2006.01)
*G06Q 50/34* (2012.01)

(52) U.S. Cl.
CPC ......... *G07F 17/3288* (2013.01); *G06Q 50/34* (2013.01); *G07F 17/3223* (2013.01)

(58) Field of Classification Search
None
See application file for complete search history.

(56) References Cited

U.S. PATENT DOCUMENTS 11,347,727 B2 * 5/2022 Qiu ....................... H04L 9/3247
11,354,727 B2 * 6/2022 Yao ....................... H04L 9/0618

(Continued)

FOREIGN PATENT DOCUMENTS

WO WO 2019/193495 A1 10/2019

OTHER PUBLICATIONS

European Search Report dated Feb. 8, 2021 for European Patent Application No. 20191202.9, 10 pages.

(Continued)

*Primary Examiner* — Ronald Laneau
(74) *Attorney, Agent, or Firm* — POLSINELLI LLP

(57) ABSTRACT

A localized electronic betting system includes: a smart contract generation module and a results engine located in a same low-latency environment as the smart contract generation module, wherein: the smart contract generation module is configured to receive a first betting statement from a first user device located within the low-latency environment, to generate a smart contract based on the first betting statement, the smart contract including a criterion to be met and configured to self-execute in response to a determination that the criterion is met, and to transmit the generated smart contract to a local blockchain node located within the low-latency environment; the results engine is configured, based on content received from a results source, to determine information indicative of whether the criterion in the first betting statement is met; and the localized betting system is configured to transmit a signal to the local blockchain node for storage on a local blockchain ledger or a local copy of a blockchain ledger, the signal containing the information indicative of whether the criterion is met. An equivalent method is also provided.

21 Claims, 19 Drawing Sheets

(56) References Cited

U.S. PATENT DOCUMENTS

| | | | | |
|---|---|---|---|---|
| 11,490,066 | B2 | 11/2022 | Hanamoto | |
| 2018/0309581 | A1 * | 10/2018 | Butler | H04L 63/0861 |
| 2019/0130368 | A1 * | 5/2019 | Li | G06Q 20/4016 |
| 2019/0304259 | A1 * | 10/2019 | Joao | G06Q 20/045 |
| 2020/0004788 | A1 * | 1/2020 | Qiu | G06F 16/9014 |

OTHER PUBLICATIONS

"Solana: A new architecture for a high performance blockchain v0.8.13" Yakovenko et al., retrieved from https://solana.com/solana-whitepaper.pdf on Mar. 22, 2022, 32 pages.

"How the Blockchain Technology is changing the Gambling Industry" retrieved from https://medium.com/coinmonks/how-blockchain-is-changing-the-gambling-industry-3c59959b7cd1 on Mar. 22, 2022, 5 pages.

"What does Gambling in a House-less Blockchain Casino look like?" retrieved from https://hackernoon.com/what-does-gambling-in-a-house-less-blockchain-casino-look-like-o91tx385s on Mar. 22, 2022, 12 pages.

"Blockchain in Online Gambling: 12 Startups to watch in 2019" retrieved from https://www.disruptordaily.com/blockchain-startups-online-gambling/ on Mar. 22, 2022, 6 pages.

"BookiePro—A Quantum Leap in Betting Exchange Technology" retrieved from https://steemit.com/bookiepro/@richard-the-lion/bookiepro-a-quantum-leap-in-betting-exchange-technology on Mar. 22, 2022, 20 pages.

How Blockchain is Changing the Gambling Industry retrieved from https://www.fxempire.com/education/article/how-the-blockchain-technology-is-changing-the-gambling-industry-486080 on Mar. 22, 2022, 7 pages.

* cited by examiner

1002

SMART CONTRACT

| | |
|---|---|
| Smart contract ID | |
| Bet ID | |
| Timestamp | |
| Wallet ID | |
| Criterion | |
| Action if met | |

Fig. 10B 126, 142

| Smart contract ID | Event ID |
|---|---|
| 1 | W |
| 2 | X |
| 3 | Y |
| 4 | Z |

Fig. 11A

1006

| Event Type ID | Available bet type ID(s) |
|---|---|
| 001 | A, B, C, D |
| 002 | A, B |
| 003 | A |
| 004 | A, C, D |

Fig. 11B

LOCALIZED BETTING SYSTEM AND METHOD

CROSS REFERENCE TO RELATED APPLICATION

This application is a continuation of U.S. patent application Ser. No. 17/396,440 filed Aug. 6, 2021, which claims the benefit of European Patent Application No. 20191202.9, filed Aug. 14, 2020, the disclosure of each of which is incorporated herein by reference in its entirety for all purposes.

TECHNICAL FIELD OF THE INVENTION

The present application relates to a localized betting system which is capable of providing near real-time betting, and methods of performing localized betting, which may optionally be performed using the localized betting system.

BACKGROUND TO THE INVENTION

Various estimates put the value of the online gambling industry in the US alone at upwards of $50 billion, with no signs of slowing down. While once confined to placement of bets on only major sporting events, the betting options available today are countless.

The majority of bets placed on e.g. sporting events are placed before the event, and are resolved after the event. For example, a bet may be placed on the overall outcome of a football match, or on the winner of a horse race. In some cases, it is even possible to place or update bets during an event—but even so, these bets still tend to pertain to the overall outcome of the game. As a result, there is little to no scope to place bets on aspects of a game which are not apparent from the outset of the game: current online betting platforms cannot cater for e.g. betting on the results of a penalty shootout, because there is no way of knowing that one will take place at the outset of the game. Similarly, during fast-paced events such as horse races, betters are unable to place bets once the race has started. If a user's horse falls, then there is no way for them to place another bet at the last minute. A key reason for this is that on the short timescales involved, it has not previously been possible to ensure that such a bet can be placed securely, in a manner whereby it can be validated without risk of tampering. The present invention aims to address this by providing betting system which enables near real-time betting in a secure manner.

SUMMARY OF THE INVENTION

The present invention aims to address the issues set out in the previous section. The present invention enables bets to be placed and resolved securely in real-time or near real time. This is achieved in the provision of a localized electronic betting system, in which bets are placed and resolved within a low-latency environment. Security of the arrangement is ensured by encoding a betting statement in a smart contract which is stored on a local copy of a blockchain ledger. In doing so, the present invention enables a more flexible betting environment, without any of the drawbacks associated with conventional online betting environments.

Accordingly, a first aspect of the present invention provides a localized electronic betting system, the system including: a smart contract generation module and a results engine located in a same low-latency environment as the smart contract generation module, wherein: the smart contract generation module is configured to: (i) receive a first betting statement from a first user device located within the low-latency environment, to generate a smart contract based on the first betting statement, the smart contract including a criterion to be met and configured to self-execute in response to a determination that the criterion is met, and (ii) transmit the generated smart contract to a local blockchain node located within the low-latency environment, for storage on a local blockchain ledger; the results engine is configured, based on content received from a results source, to determine information indicative of whether the criterion in the first betting statement is met; and the localized betting system is configured to transmit a signal to the local blockchain node, the signal containing the information indicative of whether the criterion is met.

It should be appreciated that by placing the smart contract generation module and the results engine in the same low-latency environment as each other, and as the first user device and the local blockchain node with which they are in communication, the timescale on which bets can be placed is greatly reduced. With sufficiently low latency (discussed later in this application), bets can be placed and resolved in substantially real-time. The term "low-latency environment" should be understood to refer to a computing environment, i.e. a plurality of interconnected computing modules, throughout which information or data (including instructions, and the like) can be transmitted at high-speed, preferably sufficiently high-speed that bets may be made in real-time. The kinds of bets which are enabled by the infrastructure provided by the present invention are discussed in detail later in this application. In particular, the infrastructure provided by the present invention can allow users securely to make bets on events taking place during e.g. sporting matches on a timescale which has not been possible before.

The first aspect of the invention relates to a localized betting system, but it will be appreciated that the method performed by that system is also able to provide equivalent advantages. Accordingly, a second aspect of the invention provides a computer-implemented method performed by a localized betting system operating within a low-latency environment, the method including the steps of: receiving a first betting statement from a user device located within the low-latency environment; generating a smart contract based on the first betting statement, the smart contract including a criterion to be met, and configured to self-execute in response to a determination that the criterion is met; transmitting the generated smart contract to a local blockchain node located within the low-latency environment; determining, based on content received from a results source, information indicative of whether the criterion is met; and transmitting a signal to the local blockchain node, the signal containing the information indicative of whether the criterion is met.

It will be appreciated that the advantages associated with the second aspect of the invention are equivalent to the advantages of the first aspect of the invention. It will be apparent that the optional features set out above with respect to the first aspect of the invention may also apply equally well to the second aspect of the invention, where compatible.

In some cases, the method of the second aspect of the invention may be performed by the localized betting system of the first aspect of the invention. Specifically, the smart contract generation module of the first aspect of the invention may perform the "receiving", "generating", and first "transmitting" steps; the results engine may perform the "determining" step, and any component such as the results engine may perform the final "transmitting" step. This also includes the implementation of those modules on a hardware arrangement including a set-top box and an edge computing device, which will not be repeated here.

A third aspect of the invention provides a specific arrangement of the first aspect of the invention in which the system includes a set-top box and an edge computing device which are in the same low-latency environment as a user device. In the third aspect of the invention, a smart contract is generated at the edge computing device, and includes a local copy of a blockchain ledger. Results are received from an external source via the set-top box, which then acts as the arbiter of the bet, determining whether e.g. funds should be transferred from one user to another based on the results.

More specifically, a third aspect of the present invention relates to a localized electronic betting system, the system including:

- a user device;
- an edge computing device, having located thereon a smart contract generation module, a local blockchain ledger, and a validation module, the edge computing device providing an entry point to a high-speed network; and
- a set-top box including a results engine, wherein:
  - the edge computing device is configured to receive a first betting statement from the user device, and the smart contract generation module is configured to generate, based on the first betting statement, a smart contract including a criterion to be met, the smart contract being configured to self-execute in response to a determination that the criterion is met, and the smart contract being stored on the local copy of the blockchain ledger;
  - the results engine is configured to receive content from an external source, the content including information indicative of whether the criterion is met, and to transmit the information to the edge device, where the validation module is configured to determine, based on the information, whether the criterion in the smart contract is met, and to send a signal to the local copy of the blockchain ledger, the signal indicating whether the criterion has been met; and
  - the user device, edge device, and the set-top box are located within the same low-latency environment.

BRIEF DESCRIPTION OF THE DRAWINGS

Embodiments of the present invention will now be described with reference to the accompanying drawings, in which:

FIGS. 7 to 9A are a set of flowcharts indicating a method associated with the localized betting system of FIG. 2.

FIG. 10B shows an example of a smart contract which may be used in some embodiments of the invention.

FIG. 11A shows a bet type lookup table which may be used to identify whether results metadata should be sent to the local blockchain node, in some embodiments of the invention.

FIG. 11B shows a bet type lookup table which may be used in some embodiments of the invention.

DETAILED DESCRIPTION

Figure 1A:
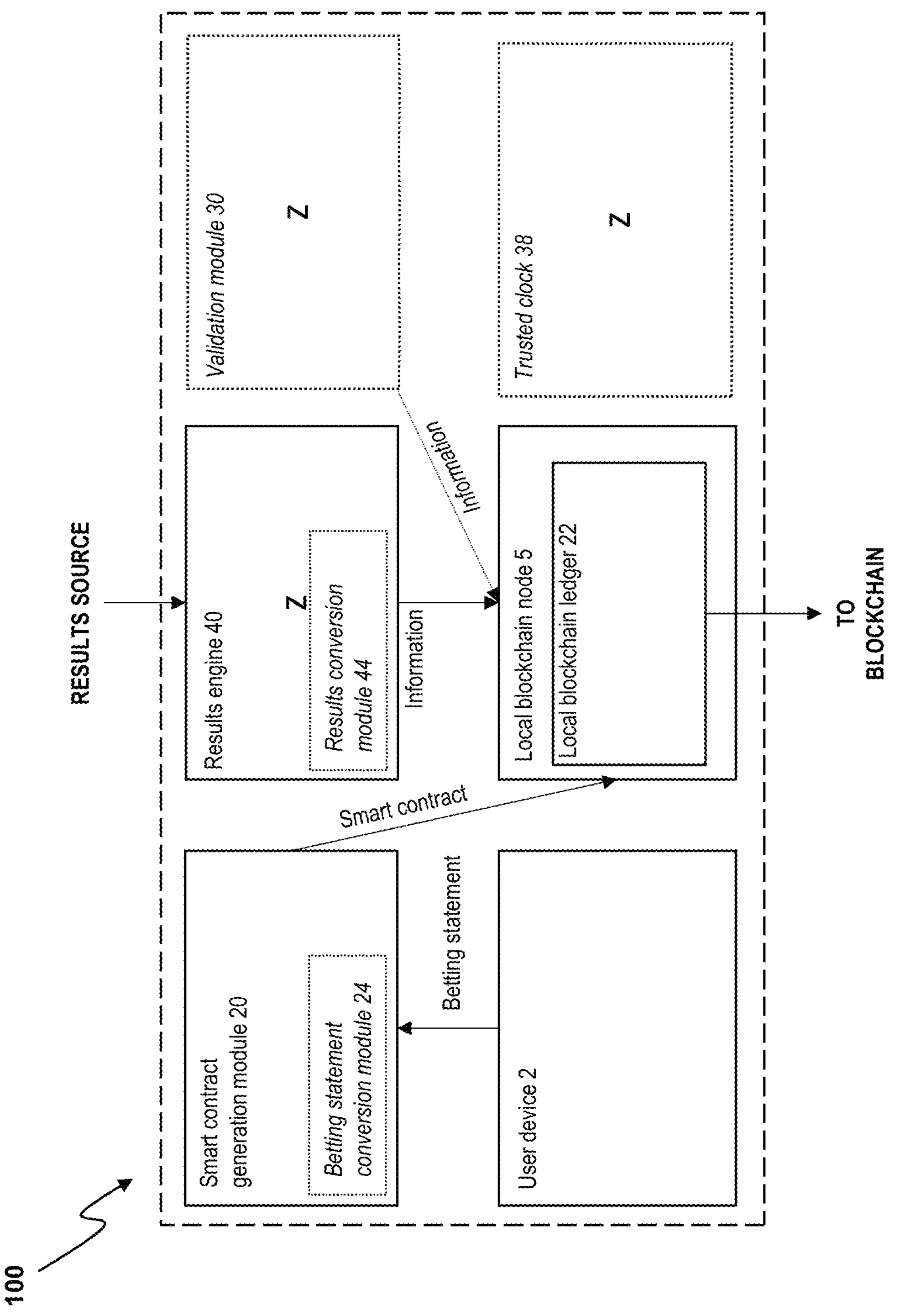
FIG. 1A shows a schematic representation of the functional modules present in an example localized betting system.

Various additional optional features of the invention are described below, with reference to FIGS. 1 to 9B. It will be appreciated that the following description pertains primarily to the optional features of the system features. However, it should be explicitly noted that all of the optional features set out below are applicable to any aspect of the invention, including methods, computer programs, computer program products, and any other features.

Before describing various embodiments of the invention, and components thereof, a list of terms used in the application and their characterizations relevant to the disclosed embodiments is set out below.

A key feature of the present invention is the "low-latency environment", since it is the placement of the relevant components within the same low-latency environment which enables the rapid operation of the system. In the present invention, the requisite "low-latency" may be defined in terms of the time taken for data to be transferred between various different components which are located within the low-latency environment (this may be referred to as the "ping time" or "round trip time"). It is preferred that the latency is no more than 100 ms. More preferably, the latency is no more than 50 ms. More preferably still, the latency is no more than 40 ms, no more than 30 ms, no more than 20 ms, or particularly preferably no more than 10 ms. The latency may represent the time required for a small amount (e.g. 1 packet) of data to be transferred between e.g. a user device and a component such as the smart contract generation module or the results engine, or any other pair of components which are located within the low-latency environment. In some configurations, the latency may represent the ping time or round trip time between two user devices, or between a user device and an edge device. As will be discussed in detail later, the desired latency may be provided by a 5G network, a LAN, or a Wi-Fi network. This is not an exhaustive list, and it is envisaged that other proprietary network technologies may be used, as long as there is some means to ensure quality of service (QOS).

In order to effect a low-latency environment, one or more of the following may be the case: the smart contract generation module may be configured to receive the first betting statement from the first user device via a high-speed network; the smart contract generation module may be configured to transmit the smart contract to the local blockchain node via a high-speed network; and the results engine may be configured to send the signal to the local blockchain node via a high-speed network.

The term "high-speed network" here refers to a network which is able to provide the low latency required for real-time or near-real-time operation, as described above. Examples include 5G networks, Wi-Fi networks or LAN, though others are possible.

The high-speed network preferably includes a plurality of edge computing devices (which may be referred to as edge nodes, edge devices, and high-speed network nodes interchangeably), which are interconnected via a high-speed connection, each of the edge computing devices defining an entry point to the high-speed network. The use of edge computing devices as network entry points is advantageous because it enables much of the computational function to take place before a signal enters the network, reducing the computational burden on e.g. cloud computing resources associated with the network. The edge computing devices are discussed in more detail elsewhere. The high-speed network is preferably a 5G cellular network, and the edge computing devices which form entry points may be referred to as 5G nodes, or 5G edge nodes. Alternatively, the high-speed network may be in the form of a Wi-Fi© network.

In this application, a "sub-network" may be defined as a set of devices which are arranged to access the high-speed network via the same entry point, i.e. via the same edge computing device, and herein it is preferred that the smart contract generation module, the results engine, and the user device are all part of the same sub-network. It is important here to make a distinction between how the terms "sub-network" and "low-latency environment" are used in the present application. There is overlap between the two, but the term "sub-network" is used to describe all of the devices arranged to access a high-speed network via the same entry point, whereas the term "low-latency environment" is broader and encompasses any arrangement of devices which are able to communicate with each other at a sufficiently low latency, be it by virtue of being on the same sub-network or otherwise. By including the components on the same sub-network, the submission of betting statements, and the clearing of the bet can all take place locally, within the same low-latency environment.

In the present application, the term "smart contract" should be understood to refer to computer code which encodes a contractual obligation, in this case the betting statement.

As the skilled person is aware, the term "blockchain" refers to a distributed ledger, i.e. a log of various transactions which is stored on a plurality of nodes. Any changes to the ledger must be validated by all or a subset of those nodes, and once a transaction to the ledger has been saved, it cannot be manipulated, without validation by other nodes. Perhaps the most well-known application of blockchain technology currently is cryptocurrency. In the case of the well-known BitCoin cryptocurrency, the blockchain ledger stores only a record of transaction of currency between different users. However, blockchain technology has advanced since then, to allow secure applications other than simple transactions of monetary tokens. Distributed applications ("dapps") are computer programs which can run over several nodes, such as blockchains, and operate some kind of functionality beyond a store of information. A smart contract is an example of a distributed application, since it is encodes an action to be performed in response to some criteria being met, the processing required to determine whether the criterion is met, and to execute the action being performed in a distributed fashion across the blockchain, rather than at a centralized node.

A "set-top box" is a device which is capable of receiving cable or satellite signals and rendering them into a format which is viewable on e.g. a television, or other appropriate monitor or monitor-style device.

We now move on to a discussion of various optional features and embodiments of the invention.

FIG. 1A shows a schematic illustration of the invention at a broad level, showing the functional modules which form part of the system, without confining them to any specific hardware. This illustrates that the invention goes beyond a specific setup. Specifically, the localized betting system 100 of FIG. 1A includes a user device 2, a smart contract generation module 20, a results engine 40, and a local blockchain node 5 having a local blockchain ledger 22 thereon. The smart contract generation module 20, results engine 40, user device 2, and the local blockchain node 5 are all located within the same low-latency environment 1. The arrows shown connecting the functional modules illustrate the data which may be transferred between them, for example (but not necessarily) via a high-speed network, as defined above. It should be noted that the advantageous effects may be achieved by the smart contract generation module 20 and the results engine 40 (located in the same low-latency environment 1), alone—defined based on the data which they are configured to transmit, process and receive. The user device 2, and the local blockchain node 5 need not be part of the invention—though of course, in some embodiments, they may be. In addition to the features described above, various optional features of the invention are also illustrated in FIG. 1A. In order to indicate that these features are optional, they are shown in dotted lines, and in italic text.

Figure 1B:
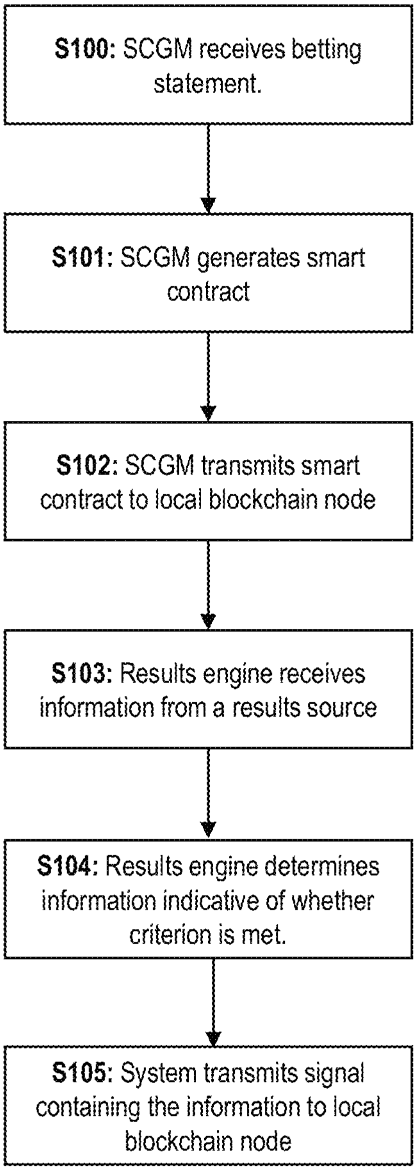
FIG. 1B is a flowchart of a process which may be performed by the system of FIG. 1A

The operation of the invention will now be described with reference to FIG. 1A, and FIG. 1B which shows a flowchart of the high-level operations performed by the present invention. It should be noted that the functions of the optional features are not shown in the flowchart, but are described in detail below.

Figure 10A:
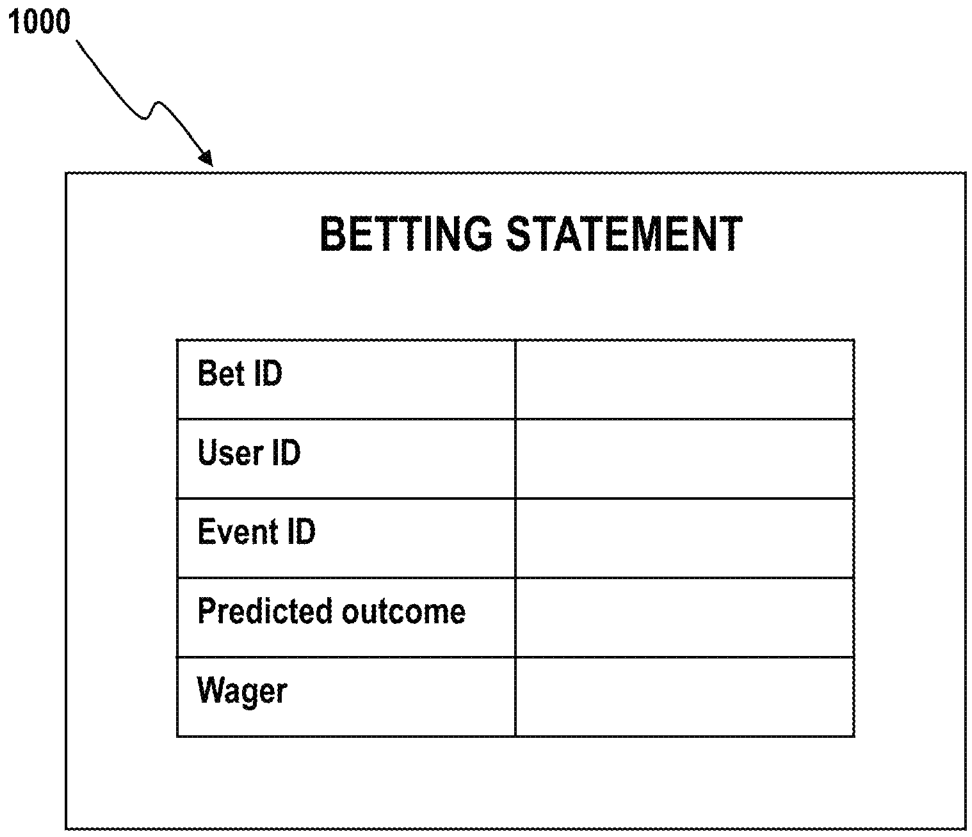
FIG. 10A shows an example of a betting statement which may be used in some embodiments of the invention.

In step S100, the smart contract generation module 20 receives a betting statement 1000 from the user device 2. The betting statement 1000 is a statement of an outcome which a user believes will take place, the outcome potentially occurring during some kind of event, the user being rewarded somehow if that event does take place. An example of a betting statement 1000 is shown in FIG. 10A, and is described in detail later on. However, it should be stressed that this betting statement 1000 is shown for illustrative purposes only, and betting statements in a diverse range of alternative forms are envisaged for use in the embodiments described herein. The reference numeral 1000 has therefore not been used in the disclosure below, to avoid confusion on this point. Accordingly, the betting statement may include one or more of the following: an indication of the event (i.e. an event ID, see FIG. 10A), and indication of the expected outcome (i.e. a predicted outcome, see FIG. 10A), and a wagering amount (i.e. a wager, see FIG. 10A). By way of example: if the event were the 2018 World Cup Final, an indication of the expected outcome may be "France to win", and the wagering amount may be €10. It is preferred that the betting statement includes metadata which is expressed in a computer-readable format, such as in code in a predetermined computing language. In order to effect this, the user device 2 or the smart contract generation module 20 may include a betting statement conversion module (see e.g. FIG. 4A) which is configured to convert a user input into a betting statement expressed in a computer-readable format, such as code. Alternatively, the user device 2 or the smart contract generation module 20 may include a metadata extraction module (see e.g. FIG. 4B) which is configured to extract metadata from a user input, the extracted metadata including one or more of the following: an indication of the event, an indication of the event outcome, and a wagering amount. In this case, either the extracted metadata or the user input may be considered to form the betting statement.

After receiving the betting statement, in step S102, the smart contract generation module 20 is configured to generate a smart contract based on the betting statement. An example of a smart contract 1002 is shown in FIG. 10B, and is described in detail later on. However, it should be stressed that this smart contract 1002 is shown for illustrative purposes only, and smart contracts in a diverse range of alternative forms are envisaged for use in the embodiments described herein. The reference numeral 1002 has therefore not been used in the general disclosure below, to avoid confusion on this point. The smart contract generation module 20 may be configured to generate the smart contract based on either the betting statement expressed in a computer-readable format, or extracted metadata, as discussed previously. The term "smart contract" has been defined earlier in this application. The smart contract may include at least a criterion to be met, and a first action to be performed should the criterion be met, as illustrated in FIG. 10B. The smart contract may also include a second action to be performed if the criterion is not met, although this is not shown in FIG. 10B. In preferred cases, the criterion to be met is based on the indication of the event and the indication of the expected outcome included in or extracted from the betting statement. Similarly, the first action and/or the second action may be based on at least the wagering amount. The smart contract is self-executing, in response to receiving information that the criterion is met. This means that when the results engine 40 transmits a signal to the local blockchain node 5 where the smart contract is located, the information in the signal causes the smart contract to self-execute, thereby causing the first action (or second action) to be performed. The smart contract may therefore include code configured to cause a computer or processor to execute the first action in response to information that the criterion has been met. In some examples, the smart contract may include an expiry time (either in the form of an absolute time at which the smart contract expires, or a duration for which the smart contract remains active). Then, in the absence of any indication or instruction from a signal at or after the expiry time, the smart contract may be configured to self-execute by performing an action, which may be the first action, the second action, or another third action.

In some cases, the smart contract may include only a single criterion to be met. This may be the result if the user is betting against the "house" on the result of say a baseball match or a horse race, with different outcomes being performed depending on whether the user wins or loses the bet. However, in alternative cases, users may wish to bet against other users. In these scenarios, the smart contract generation module 20 may be configured to receive a second betting statement from a second user device (not shown), also located in the same low-latency environment 101. The smart contract generation module 20 may then be configured to generate a smart contract including a first criterion based on the first betting statement and the second criterion based on the second betting statement, wherein the smart contract is configured to self-execute to perform a first action in response to receipt of information that the first criterion has been met, and to perform a second action in response to receipt of information that the second criterion has been met. The smart contract may also be configured to self-execute to perform a third action in response to receipt of information that neither the first criterion nor the second criterion has been met.

This may be further generalized to a plurality of users. Specifically, the smart contract generation module 20 may be configured to receive a plurality of betting statements, from a respective plurality of user devices. The smart contract generation module 20 may then be configured to generate a smart contract including a plurality of criteria, each of the plurality of criteria based on a respective betting statement, wherein in response to receipt of information that a criterion of the plurality of criteria has been met, the smart contract is configured to self-execute to perform a respective action of a plurality of actions, the respective action associated with either the criterion which has been met, a determination that none of the criteria has been met, or the receipt of no information as to whether the criterion has been met. Such a system may allow a group of friends watching e.g. a horse race each to bet on a different horse, with the winner taking all of the staked money. In some cases, this configuration may be modified slightly so that more than one betting statement may be received from a given user device, and accordingly, some of the actions of the plurality of actions may apply to more than one of the criteria (for example, if User A has made three bets, the action "transfer funds to User A" may apply to the criteria associated with each of their three betting statements).

In general, the various components in the system can be trusted to agree with each other when it comes to relative timekeeping, i.e. measuring the time interval between two events occurring on or at that component. Alternatively put, the clocks on the components can be trusted to run at the same rate (at least to within an acceptable degree of error). However, when resolving bets which relate to short timescale events in e.g. a sporting event, and with the betting statements and the results coming from different sources which are external to the system, it may be necessary to compare the absolute (i.e. "actual") time at which the outcome takes place in an event, and the absolute time at which the bet is placed, to ensure that the bet was actually placed before the outcome took place. This means that users are unable to exploit or otherwise abuse the latency of the system in order to collect on a bet which was placed after an event took place, for example.

In order to contribute to this improvement in security and integrity, the smart contract generation module 20 may be configured to include a time stamp in the smart contract. For example, the smart contract generation module 20 may be configured to receive a betting statement which includes a timestamp, and to include this timestamp in the smart contract. In other cases, the smart contract generation module 20 may be configured to generate its own time stamp when it generates the smart contract. Specifically, the smart contract generation module 20 may be configured to include the timestamp in the criterion to be met, such that the criterion includes an expected outcome and either: a time range during which the expected outcome must occur, or a time after which the expected outcome must occur, in order for the criterion to be met. In order to enable this, the localized betting system of the present invention includes a trusted clock 38, shown as an optional feature in FIG. 1A. Here, the term "trusted" should be understood to mean that the clock in question is the one on whose absolute time reading the other components are configured to rely.

In some cases, when the smart contract generation module 20 receives the first betting statement at a first time, it may then be configured to request a timestamp from the trusted clock 38. The smart contract generation module 20 may then be configured to include this time stamp in the smart contract, preferably as part of the criterion to be met. Alternatively, the user device 2 may be configured to request a timestamp from the trusted clock 38 when sending the betting statement, and it may be included in there. The smart contract generation module 20 may then be configured to extract the timestamp from the betting statement, and to include it in the smart contract.

In step S104, the smart contract generation module 20 transmits the generated betting statement to the local blockchain node 5, for storage on the local blockchain ledger 22. At this point is useful to describe the nature of the smart contract and the blockchain in more detail. Definitions of the relevant terms have been set out earlier in the application.

In order to ensure a swift transmission of the smart contract from the smart contract generation module 20 to the local blockchain node 5, it is preferred that the local blockchain node 5 is also part of the low-latency environment including the smart contract generation module 20 and the results engine 40, as shown in FIG. 1A. This also minimizes the amount of time taken for the smart contract to be safely stored on the ledger associated with the blockchain. It should be noted that herein, the term "local blockchain node" refers to the node of the blockchain which is local to the smart contract generation module 20, i.e. the node via which the smart contract generation module 20 is able to access the blockchain. The local blockchain node 5 has a local blockchain ledger 22 (or a local copy of the blockchain ledger), on which the smart contract may be stored. Due to the short-timescale bets enabled by the present invention, it is important that new data, i.e. the smart contract can be written to the local blockchain ledger 22 as quickly as possible, i.e. with minimum latency. In order for this to occur, it is preferable that the local blockchain node is part of a blockchain configured to operate using a proof-of-history approach, rather than, for example a proof-of-stake or proof-of-work. An explanation of the proof-of-history methodology may be found in WO 2019/193495 A1, and in the white paper "Solana: A new architecture for a high performance blockchain v0.8.13". The use of a proof-of-history blockchain removes the need to rely on a timestamp which is applied to some event, instead enabling a user or a node to prove that some event occurred before or after some other event, with no reliance on any kind of third party clock. In some cases, the smart contract may be replicated across a plurality of nodes as soon as it is transmitted to the local blockchain node 22. In other cases, the replication of the smart contract on the blockchain takes place only after the bet has been resolved, e.g. to effect the transfer of funds.

Before describing the resolution or clearing of the bet which takes place in steps S103 onwards, it is helpful to define a token. A token is a transferrable entity, which may in the form of currency. In order to replicate "real-world" betting such as at a bookmaker's or a casino, users of the localized betting system of the present invention may wager a given amount of tokens on a particular outcome occurring in a particular event. Much like an online banking system, a record of a user's available funds and transactions between users is stored on the blockchain. However, unlike an online banking system, the records of a user's available funds are stored in a decentralized manner across all of the nodes in the blockchain, rather than in one central memory. A plurality of wallets are defined, each having a wallet identifier, or wallet ID for short. The wallet contains a record of the amount of tokens associated with a particular user or user account. Preferably, the smart contract includes the wallet identifier associated with all of the parties involved in a given bet. The first and second actions (or the plurality of actions), as defined previously, may then include: a source wallet identifier, a number of tokens, and a destination wallet identifier, wherein self-execution of the smart contract includes transferring the number of tokens from the wallet associated with the source wallet identifier to the wallet associated with the destination wallet identifier. In general, it is preferable that self-execution of the smart contract takes place in the low-latency environment 1. After execution of the smart contract on the low-latency environment 1, the results of the contract may then be reconciled to the main ledger via consensus. In other words, the local blockchain node 5 may be configured to transmit the smart contract, and the results associated with its execution to the other nodes in the blockchain. This effectively adds another "block" to the chain or the ledger. The additional "block" may include: the smart contract identifier, the smart contract itself, a record of the transaction between the wallet associated with source wallet identifier and the wallet associated with the destination wallet identifier. In an alternative case, as discussed, the smart contract may be replicated across the whole blockchain before resolution of the bet.

Tokens may be added to a user's wallet in a number of ways. For example, a customer may simply be able to purchase tokens. However, in some cases, users may be rewarded with tokens for performing various actions. For example, a processor (which may be located in various locations) may be configured to receive input indicating that a user has performed a reward action on e.g. their user device, or an action which is detected by their user device. On receipt of the input indicating that a reward action has been performed, the processor may be configured to send a signal to the local blockchain node 5, the signal indicating that a token or plurality of tokens should be added to the user's wallet. The user device preferably has an associated user device identifier, or the user has an associated user identifier in use on the user device, and there is preferably a one-to-one mapping between the user identifiers and the wallet identifiers, which may be stored in a lookup table on a memory. With this in mind, it is preferred that the input indicating that a user has performed a reward action also includes the user identifier. The processor is preferably configured to perform a lookup on the lookup table on receipt of the input, in order to determine the wallet identifier associated with the user identifier indicating who has performed the reward action. The reward action may take various forms, specifically it may include: watching a video (such as an advertisement) on the user device, taking a survey, visiting a particular website, playing a game, leaving a review, purchasing a product on an online shop. In other cases, the reward action may prompted by a physical action which is detected by the user device. For example, a GPS, Bluetooth®, or Wi-Fi® connection may be used to detect that a user has entered a particular location, such as a shop or a bar. The user may then be rewarded with a token for doing so. A smart contract could also be used to effect the addition of a token to a user's wallet on completion of a reward action.

In addition to the components already listed, the localized betting system may further include a memory (not shown in FIG. 1A—but shown in the embodiments of e.g. FIGS. 2 to 5), separate from the local blockchain node 5. In such cases, the smart contract generation unit 20 may be configured to store a copy of the smart contract in the memory. Alternatively, the smart contract generation module 20 may be configured to store a smart contract identifier in the memory, the smart contract identifier uniquely identifying the smart contract. The smart contract generation module 20 may be configured to include the smart contract identifier in the smart contract itself, or to transmit it to the local blockchain node 5 along with the smart contract. In response to receiving the smart contract, the local blockchain node 5 may be configured to transmit a blockchain identifier to the localized betting system, the blockchain location identifier uniquely identifying the position of the smart contract within the blockchain ledger. In such cases, the localized betting system may be configured to store the blockchain location identifier in the memory, in association with the smart contract identifier, for example in a lookup table. The smart contract generation module 20 may also be configured to store an event identifier in association with the smart contract identifier and/or smart contract, the event identifier uniquely identifying the event to which a given smart contract refers. In addition, the smart contract generation module 20 may also be configured to store additional data relating to the betting statement in the memory, such as an identifier uniquely identifying the type of outcome ("outcome identifier"), or a person involved in the outcome ("person identifier"). All of these data referring to the smart contract and/or betting statement may be referred to as smart contract metadata.

A number of different modes of betting may be available for a given event. In addition to different types of bet, bets may be placed between different groups of people, and the operation of the localized betting system may be slightly different in each case. Three modes of betting are described here: person-to-house betting, person-to-person betting, and pool betting.

In person-to-person betting, each associated person requires a suitable user device (such as user device 2). In order to achieve betting on the timescales enabled by the present invention, the first user device and the second user device should be part of the same low-latency environment. It will be noted that only a single user device 2 is shown in FIG. 1A, but the skilled person is aware that this could be extended to any number of user devices 2. Specific embodiments each showing two users devices, are described in detail later. Preferably, the first device and the second device both have the same application installed thereon. Connection between the two devices may be established by means of e.g. Bluetooth®, near-field communication, or by scanning of a QR code. The users may then user the applications to define their bet, and then the first user device may be configured to transmit the first betting statement to the smart contract generation module 20, and the second user device may be configured to transmit the second betting statement to the smart contract generation module 20. Alternatively, one of the user devices may be configured to send just a single betting statement which encodes the positions of both of the user devices. A pool betting system is analogous to this, except rather than just a first user and a second user, there is a general plurality of users. In person-to-house betting, the situation is simpler, with no need for the user to connect in any way with another user.

Now that the smart contract which encodes the bet is stored safely on the local blockchain node 5, at step S103, the results engine 40 receives information from a results source, and in step S104, the results engine 40 determines information indicative of whether the criterion in the smart contract is met. This latter "information" should be treated broadly, and does not necessarily amount to a simple "yes" or "no"—although it may do.

It is known that the use of blockchain technology provides for increased security, since the information on a blockchain is stored in a decentralized manner (i.e. across a plurality of nodes) and cannot be altered without the consensus of some or all of the nodes on the blockchain (so-called immutability). The present invention requires that the results engine 40 makes use of content received from a results source, may be external to the system, and to the low-latency environment. Because this results source may be located outside the blockchain itself, it is susceptible to interference in a manner which the blockchain is not. In order to avoid this, and for the system to maintain complete integrity, the results engine 40 must be configured to receive information from a trusted source. Herein, "trusted source" refers to an independent source of results which is preferably unrelated to the user device 2. By employing a trusted source, the risk of undesirable interference (i.e. cheating) is reduced. In some specific implementations, the results source may include a plurality of user devices 2. This is discussed in relation to a specific mode of betting later in this application.

The results engine 40 may also be configured to receive results from an external results source, such as a satellite or cable television provider, or other results provider. When the results engine 40 receives the results from an external source, they may not be in a form which is useful for the resolution of the bet. Accordingly, the results engine may include a results conversion module 44 which is configured to convert the raw results received from the external source into results metadata, preferably with a time stamp based on a reading of the trusted clock at that time. Alternatively, the results engine 40 may be configured to receive results in the form of results metadata, in which case the results conversion module 44 may not be required. Herein, the term "results metadata" is used to refer to data indicating the received results which is in a format on which bet resolution processing can be carried out, in the manner outlined below. Results metadata is preferably in a computer-readable format.

As discussed above, it is important that an accurate measure is taken of the time at which a given result occurred, e.g. a particular outcome in a particular event. With this in mind, it is preferable that the results include a timestamp, the timestamp providing an indication of the time at which the result occurred. It is preferable that the time is an absolute time, and it is preferable that the absolute time is provided by a trusted clock 38. It has already been noted that the system may include a trusted clock 38, as shown in FIG. 1A as an optional feature; when this is the case, it is preferred that the results engine 40 includes the trusted clock 38, though, as will be appreciated from FIG. 1A, the trusted clock 38 may be a separate module or entity. In a preferred arrangement, the results engine 40 may be configured to receive raw results data from an external source, and to convert (using a results conversion module 44 or otherwise) those raw results data into results metadata, the results metadata including a time stamp which is based on a reading from the trusted clock 38. The results conversion module 44 may be configured to request a timestamp from the trusted clock 38, such that the output of the results conversion module 44 includes the timestamp. Alternatively, the results engine 40 may further include a timestamping module (not shown in FIG. 1A, but included in the embodiments of e.g. FIGS. 3A to 3C) which is configured to add the timestamp to the results metadata which is output from the results conversion engine. It will also be appreciated that, in particular examples in which the results engine 40 is configured to receive results metadata, the timestamping module may be configured just to add a timestamp to this metadata, the timestamp indicating, for example, the time at which the results metadata was received by the results engine 40. It is also equally feasible that the timestamping module is configured to add the timestamp to the raw results data, and that the results conversion is configured to convert the time-stamped raw results data into results metadata including the timestamp. Other arrangements are also possible. It should be noted that, in order to effect the timestamping, the timestamping module is preferably configured to receive an input from the trusted clock 38, the input preferably in the form of the trusted, absolute time. Alternatively, the trusted clock 38 may be located within the timestamping module.

In step S105, a signal containing the determined information is transmitted to the local blockchain node 5. In some cases, the results engine 40 is configured to transmit the information indicative of whether the criterion has been met to the local blockchain node. It should be noted that "information indicative of where the criterion has been met" as referred to hereinabove should be interpreted broadly as covering any information from which it may be derived whether the criterion has been met, or not. It is not necessarily restricted to refer to data which specifically either states that the criterion has been met, or that it has not been met. So, a large amount of data including all of the results of an athletics meeting might be considered to represent information indicative of whether a criterion relating to a bet on a specific heat of a specific race has been met. In preferred cases, as outlined above, the results engine is configured ultimately to generate results metadata which includes an indication of whether the criterion in the smart contract has been met, and a trusted timestamp. At this point, the results engine 40 has no "knowledge" of the criterion—but it should be understood as implicit that the relevant results will include information indicative of whether the criterion is met. In some cases, the results engine 40 is configured at this point to transmit the results metadata to the local blockchain node 5. The results engine 40 may be configured also to transmit one or more of the event identifier, smart contract identifier, and blockchain location identifier in addition to the results metadata, in order to aid the local blockchain node 5 in identifying the smart contract stored thereon to identify which smart contract the results metadata refers to.

The results data from the results source may include information identifying the event to which it pertains, or information relating to the outcome or a person related to the outcome. This information preferably includes e.g. an event identifier, an outcome identifier, or a person identifier, which is particularly preferably in the same format as the smart contract metadata. Then, in order to ensure that only the most relevant results metadata is sent to the local blockchain node 5, on receipt or generation of results metadata, the results engine 40 (or another component such as a general purpose processor) of the localized betting system may be configured to perform a lookup in the lookup table of the memory of the localized betting system in order to determine whether any of the identifiers in the results metadata correspond to any of the smart contracts which have been generated by the smart contract generation module 20. Such a lookup table (which may represent either lookup table 126 or lookup table 142) may include a first column including the smart contract IDs of all the smart contracts which are stored on the localized blockchain node, and a second column including the event IDs of the events to which those smart contracts pertain, a simple non-limiting example being shown in FIG. 11A. In this case, if results metadata relating to events W and X were received, these would be transmitted to the local blockchain node 5. However, results metadata relating to events U and V would not be transmitted, because no smart contracts relate to these events. In the event that it is determined that the results metadata does include metadata which corresponds to any of the smart contracts generated by the smart contract generation module 20, the results engine 40 may be configured to transmit only the subset of the results metadata which corresponds to the smart contracts. In this way, the amount of data which must be sent to the local blockchain node 5 may be greatly reduced, reducing the computational burden on both the results engine 40 and the local blockchain node 5.

In the scenarios outlined in the previous paragraph, the results metadata itself is sent to the local blockchain node 5. However in some arrangements, the localized betting system 1 may further include a validation module 30 configured to receive the results metadata from the results engine 40, and to determine whether the criterion (or criteria) in the smart contract has (or have) been met. Then, rather than the results engine 40 sending the results metadata to the local blockchain node 5, which effectively requires additional processing on the part of the local blockchain node 5 (or other nodes in the blockchain) in order to determine whether the criterion is met, the validation module 30 may be configured to send a signal containing information indicating only whether the criterion is met. Then, on receipt of this information, the smart contract is able to "decide" whether or not to self-execute without the need for any additional processing.

Alternatively, and advantageously, in response to determining that the criterion has been met, the validation module 30 may be configured to transmit to the local blockchain node 5 a signal including instructions that the smart contract should self-execute. In implementations of the system in which the smart contracts include a plurality of criteria to be met, the validation module 30 may be configured to determine which, if any, of the criteria have been met, and to transmit to the local blockchain node 5 a signal including instructions that the smart contract should self-execute to perform an action associated with the criterion (or criteria) which has (or have) been met. In determining whether the criterion has been met, the validation module 30 is preferably configured to compare the timestamp of the results metadata with the timestamp of the betting statement or the timestamp of the smart contract. If it is determined that the timestamp on the betting statement or smart contract is later than the timestamp of the results metadata, the validation module 30 is preferably configured either to transmit a signal indicating that the criterion has not been met, or not to transmit a signal at all.

It is widely known that it is popular all over the world to bet on the outcomes of sporting events. Such sporting events are often broadcast on cable or satellite television. Accordingly, in one implementation of the present invention the localized betting system 100 may include a set-top box 108. This term is defined in the "definitions" section of this application. A specific arrangement of a betting system 100 including a set-top box 108 is shown in FIG. 2, but before describing that in detail, we discuss some more general points about embodiments of the invention including a set-top box, making reference to the drawings where convenient.

Figure 2:
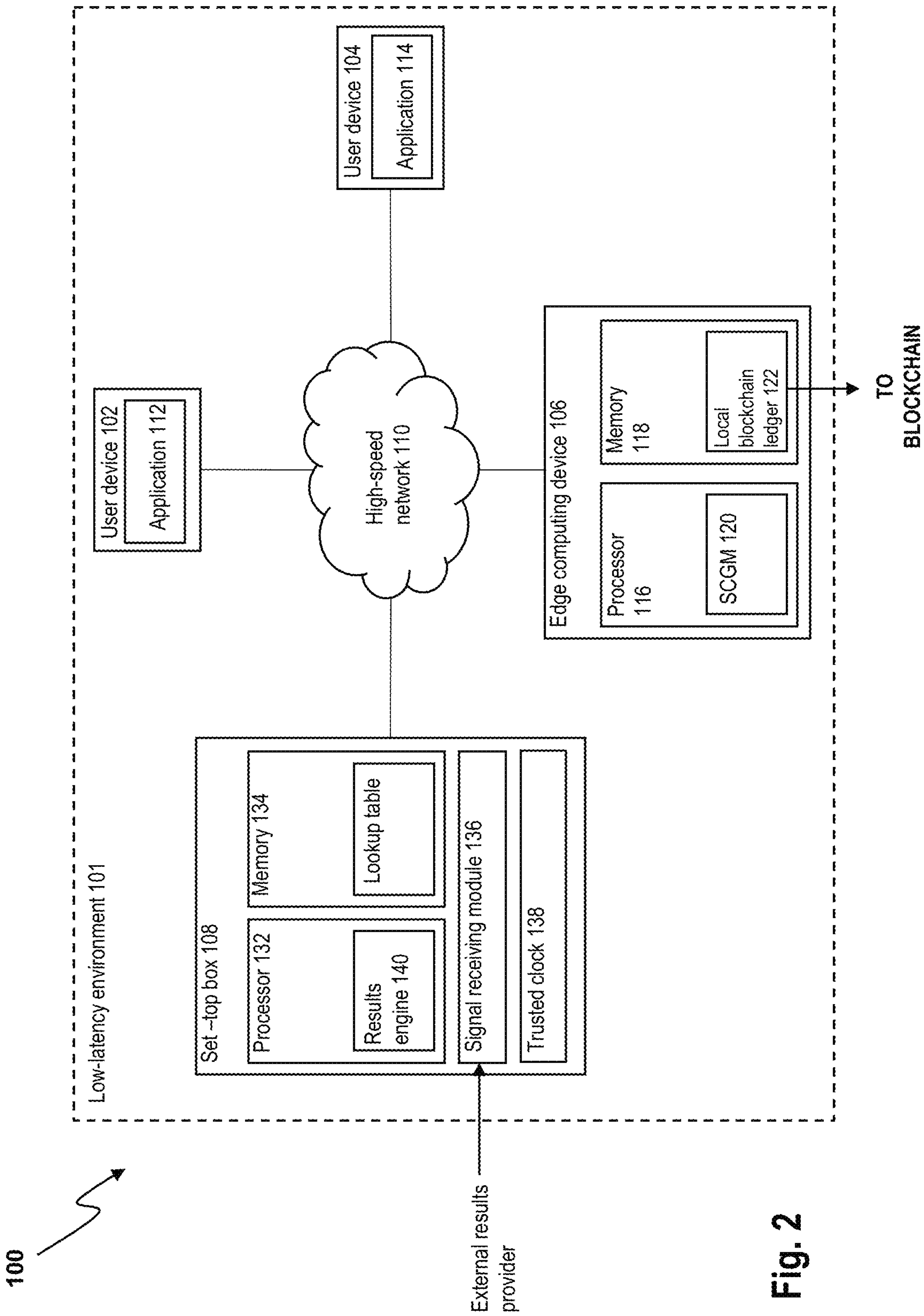
FIG. 2 is an example shows a localized betting system including a set-top box, an edge computing device, and two user devices.

Optionally, and as shown in FIG. 2, the set-top box 108 may include the results engine 140, and the cable or satellite television provider (herein, for brevity, "the provider") may represent the results source. The raw results data may be in the form of the full programming stream received from the provider. Alternatively, the provider may be provide a separate results stream including the raw results data. The set-top box 108 may further include a results conversion module 144 (see e.g. FIGS. 3A to 3C) configured to extract the results metadata from the raw results data from the provider. Preferably the set-top box 108 also includes the trusted clock 138 as described earlier in this application. In this way, the set-top box 108 is able to receive the results and attach a reliable timestamp thereto, thus acting as the broker or arbiter of the bets. If the localized betting system 100 includes a validation module 130 in addition to the results engine 140, this component may also be located on the set-top box 108. In such cases, it is preferable that the memory is also stored on the set-top box, so that the validation module 130 can efficiently perform a lookup using the lookup table 142 on in order to determine whether a criterion in a given smart contract has been met.

As is also illustrated in FIG. 2, the localized betting system 100 may include an edge computing device 106, which may include the smart contract generation module 120. The edge computing device 106 preferably also houses the local blockchain node, or is the local blockchain node.

In this application, it should be understood that the local blockchain node provides an entry point to the "whole" blockchain. The edge computing device 106 may also be a high-speed network access edge computing device, as discussed earlier in this application. In implementations in which the results engine 140 and validation module 130 are separate components, the validation module 130 may be located on the edge computing device 106. It may, then, be configured to receive the results metadata from the results engine 140 located on the set-top box 108, and to output the results to the local blockchain node located on the same edge computing device 106. In such cases, the (trusted) results of the bet are received at the set-top box 108, and the clearing of the bet (i.e. determining whether the criterion is met, thereby causing self-execution of the smart contract) take place at the edge device 106. To reiterate, this can be performed rapidly, because both of these components are located within the low-latency environment. Alternatively, the validation module 130 can be located on the set-top box 108, so that the results are received at the set-top box 108, and the validation module 130 is configured to determine whether the criterion is met on the set-top box 108, before transmitting the results to the edge computing device 106. In such cases, the set-top box 108 acts as the receiver of the results and the broker/arbiter of the bet. By determining whether the criterion is met, the set-top box 108 (and more generally, the validation module) is effectively able to decide who has "won" the bet.

The above disclosure is general, and describes various possible configurations of a localized betting system including a set-top box 108. FIGS. 2, 3A to 3C, and 4A to 4C show configurations of a localized betting system 100, which are described below. It should be noted that all of the optional features set out with reference to FIGS. 1A and 1B, concerning the betting statement, the smart contract generation module, the results engine, the local blockchain node, the local blockchain ledger, the validation module, the results conversation engine, the memory, the low-latency environment, the high-speed network, and any other component described, also apply to the equivalents of those components a shown in FIGS. 2, 3A to 3C, and 4A to 4C, as well as any other configurations described.

The system 100 of FIG. 2 includes a user device 102, a user device 104, an edge computing device 106, and a set-top box 108, all of which are connected to each other via high-speed network 110.

It should be noted that in alternative embodiments, the user device 102, the user device 104, the edge computing device 106 and the set-top box 110 may not be connected to each other only by a single high-speed network 110, as is illustrated in FIG. 2. Alternatively, subsets of the devices shown may be connected to each other by other, smaller high-speed networks. Importantly, the user device 102, the user device 104, the edge computing device 106, and the set-top box 108 are all located within the same low-latency environment 101. A low-latency environment 101 is provided by virtue of the fact that the components are all interconnected via a high-speed network 110. As discussed previously, the high-speed network 110 may be in the form of a 5G cellular network. This is advantageous because it is able to provide high-speed connectivity between components which are not located physically close to each other. However, other networks such as Wi-Fi® networks may be used as well. In this case, the data transfers is take place via a single high-speed network 110.

In an alternative embodiment (not shown), as alluded to above, the various components of the localized betting system may be located on more than one sub-network (albeit within the same localized betting environment). For example, in some cases, the smart contract generation module may be configured to receive the first betting statement via a Wi-Fi® network, and the results engine may be configured to receive the results from the results source via either a 5G cellular network or a Wi-Fi® network. In some cases, the results engine may be configured to receive the results from the results source via a satellite or cable television network, from e.g. a satellite or cable television provider. This particular arrangement is discussed in more detail elsewhere in this application. The results engine may then be configured to send the signal to the local blockchain node via a 5G cellular network.

Each of the user devices 102, 104 has installed thereon a respective application 112, 114 respectively. The applications 112, 114, or "apps" are software applications which enable the user to receive information about bets, to contact other users close by, to place bets, and to receive information about the results of bets.

Figure 4A:
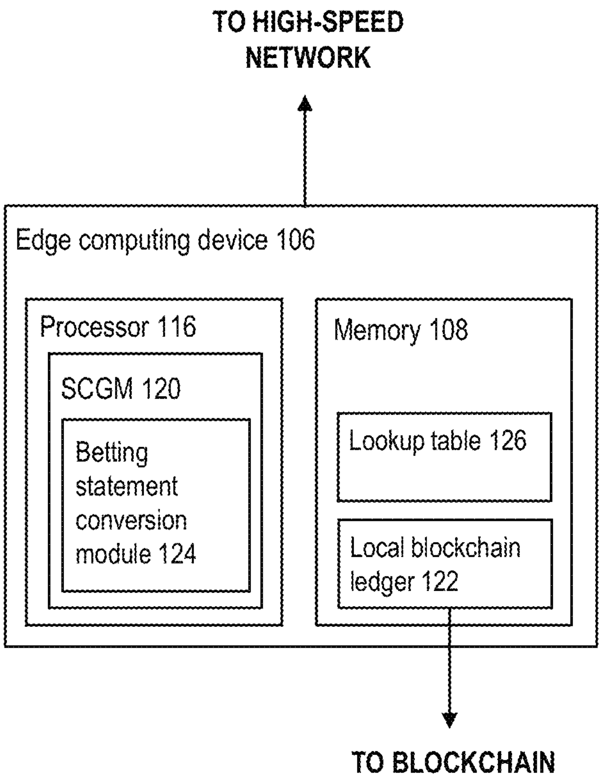
FIGS. 4A to 4C show alternative examples of an edge computing device which can be used in the localized betting system.
Figure 4B:
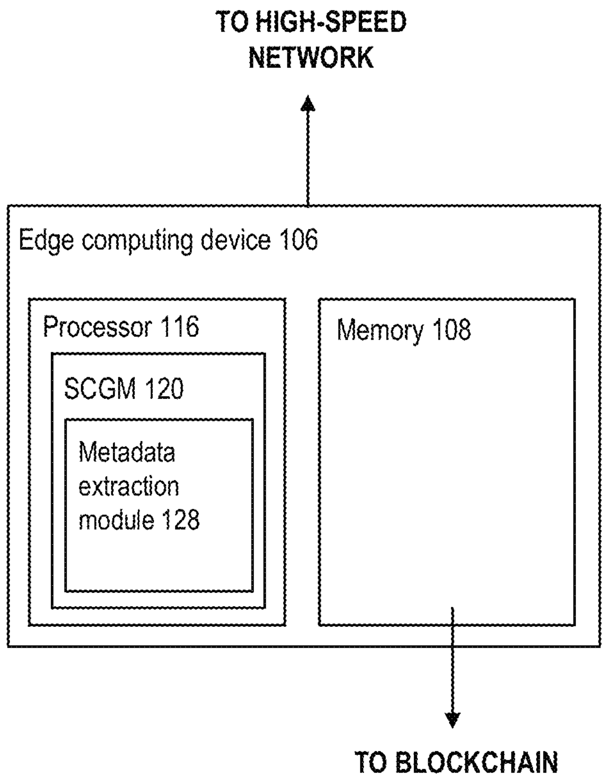
Figure 4C:
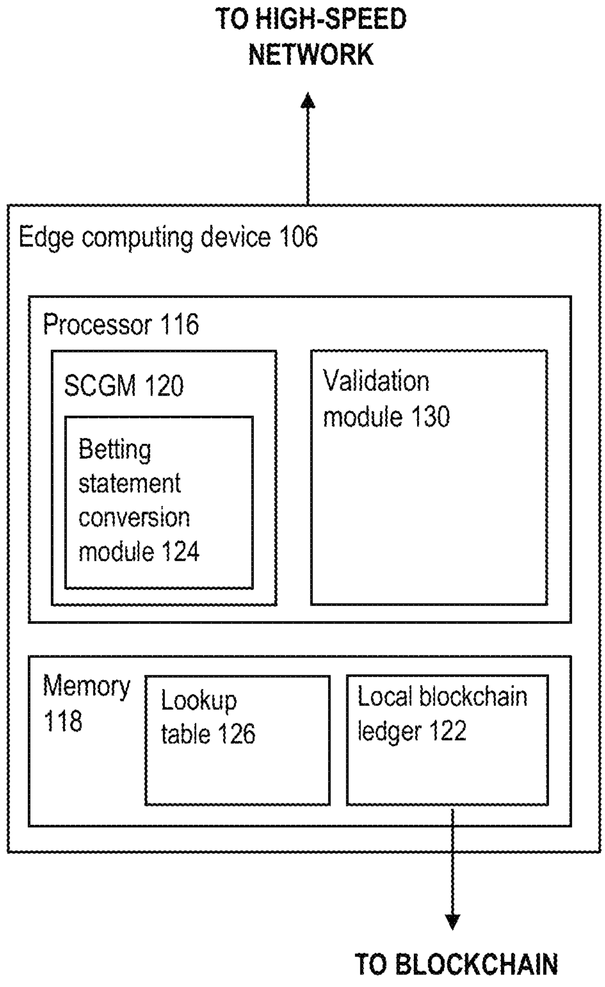

In the embodiment of FIG. 2, the edge computing device 106 includes a processor 116 and a memory 118. The processor 116 includes a smart contact generation module (SGCM) 120, and the memory 118 includes a local blockchain ledger 122, which is a local copy of the ledger stored within the "full" blockchain (not shown). The local blockchain ledger 122 is in data communication with the full blockchain, as illustrated—though the full blockchain in the present embodiment is located outside the low-latency environment 101. Herein, when two entities are in "data communication", they are able to exchange data between each other. FIG. 4A shows an alternative configuration for the edge computing device, in which the processor 116 includes a smart contract generation module 120 which further includes a betting statement conversion module 124. Similarly, the memory 118 of the edge computing device 106 further includes a lookup table 126 in addition to the local blockchain ledger 122. Another alternative implementation of the edge computing device 106 is shown in FIG. 4B, in which the betting statement conversion module 124 is replaced with a metadata extraction module 128. The operations of these different modules will be described later in this application. The memory 118 is unchanged relative to the memory 118 shown in FIG. 4A. A further alternative implementation of the edge computing device 106 is show in FIG. 4C. Here, in addition to a smart contract generation module 120, the processor 116 also includes a validation module 130. In this case, the smart contract generation module 120 includes a betting statement conversion module 124, but it will be appreciated that a metadata extraction module 128 could also be used here, as in e.g. FIG. 4B. It should be stressed that FIGS. 1 and 4A to 4C do not provide an exhaustive set of implementations of the edge computing device 106, rather they represent four of a set of many examples, all of which fall within the scope of the present invention.

Figure 3A:
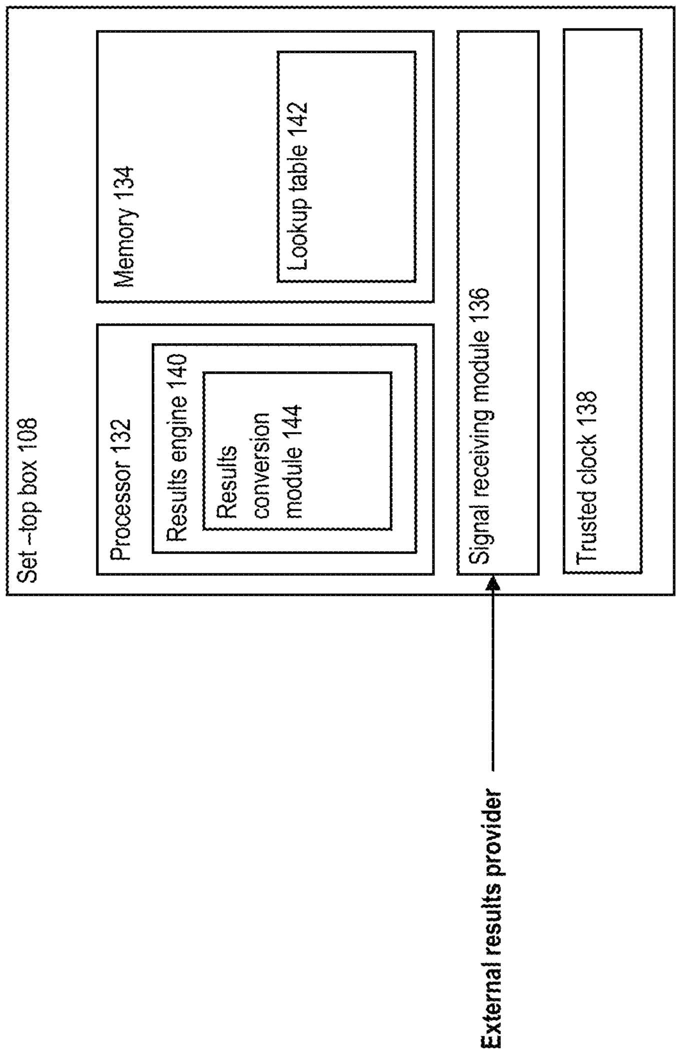
FIGS. 3A to 3C show alternative examples of set-top boxes which can be used in the localized betting system.
Figure 3B:
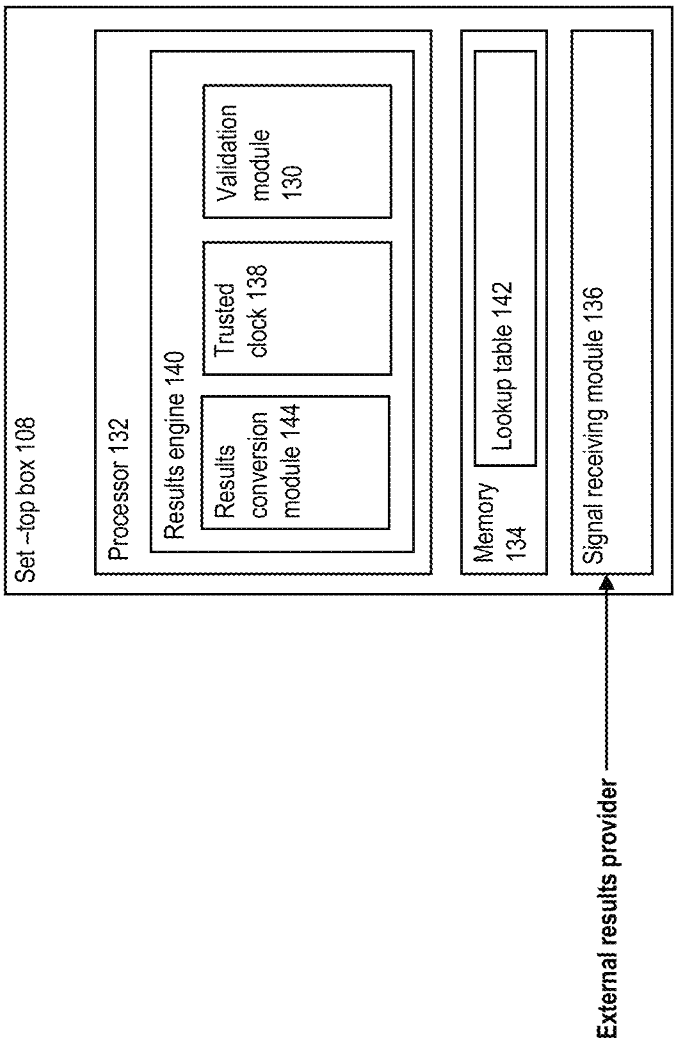
Figure 3C:
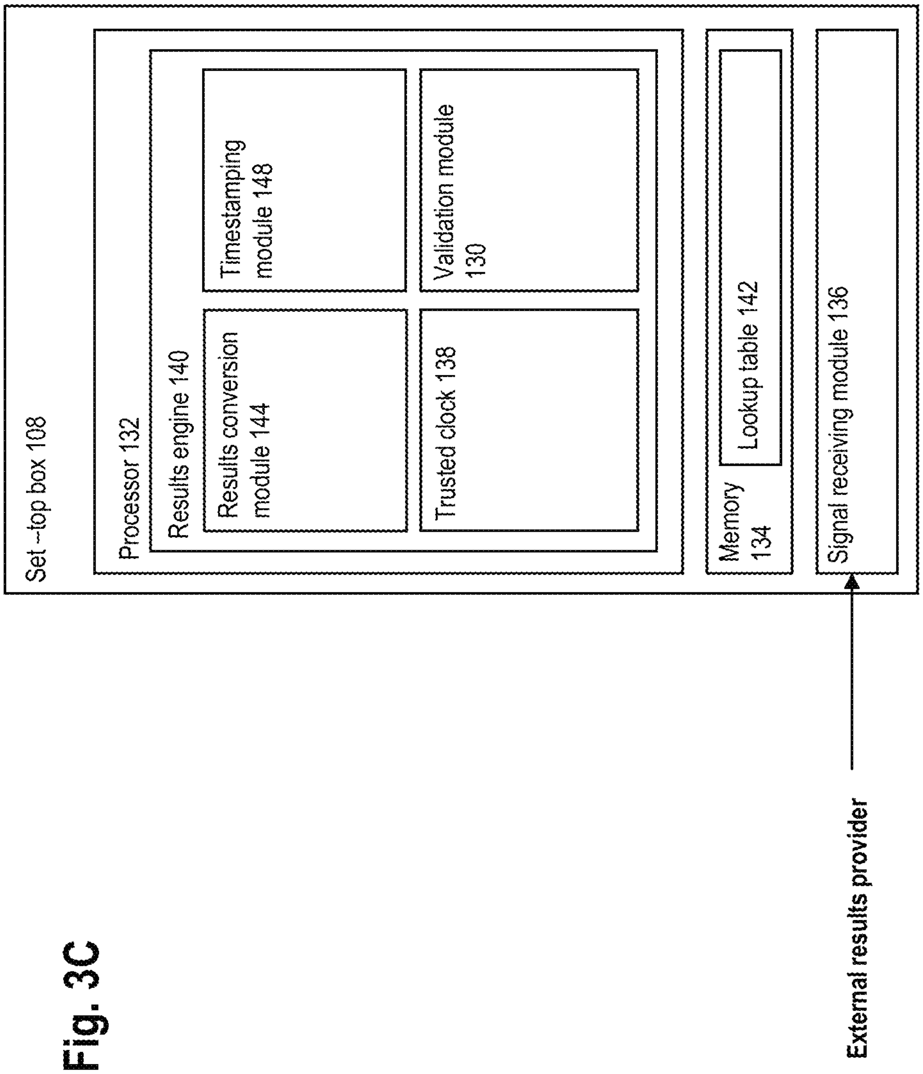

The set-top box 108 of localized betting system 100 includes a processor 132 and a memory 134, as well as a signal receiving module 136 and a trusted clock 138. In the embodiment shown in FIG. 2, the processor includes a results engine 140, and the memory includes a lookup table 142. The signal receiving module 136, as the name suggests, is configured to receive a signal from some external results provider. Alternative configurations for the set-top box 108 are shown in FIGS. 3A to 3C. In FIG. 3A, the results engine 140 includes a results conversion module 144. In FIG. 3B, the arrangement of the set-top box 108 is changed more significantly, relative to the arrangement shown in FIG. 2. Here, the results engine 140 includes the results conversion module 144, the trusted clock 138, and a validation module 130. It will be appreciated from the present application as a whole that only a single validation module 130 is necessary in the localized betting system 100, so the set-top box 108 of FIG. 3B is unlikely to be used in a system 100 along with the version of the edge computing device 106 shown in FIG. 3C. A further alternative example of a set-top box 108 is shown in FIG. 3C, in which the results engine includes a results conversion module 144, a trusted clock 138, a validation module 130, and a timestamping module 146. The functions of these components will be described in more detail later in the application.

It should be noted that in FIGS. 2 and 4A to 4C, the set-top box 108 may be replaced by any component which is configured to receive some kind of programming stream from a results source, external or otherwise. The set-top box 108 may be replaced by any computing device which is able to receive data from an external source via some kind of network. It may for example, be in the form of a conventional computer, tablet or smartphone which is able to stream content from the internet.

Figure 5:
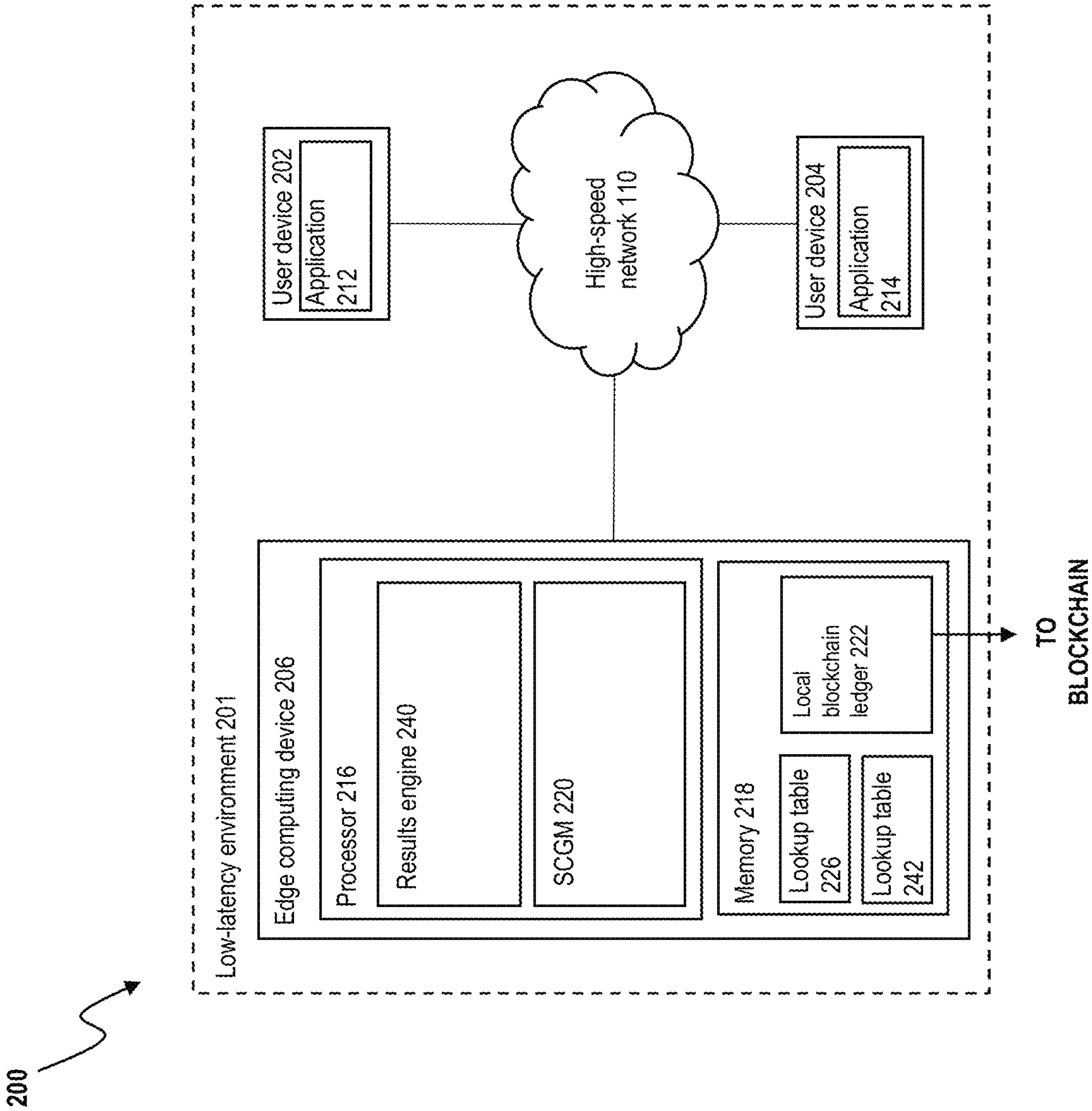
FIG. 5 is an alternative localized betting system, including only an edge computing device and two user devices.

FIG. 5 shows an alternative localized betting system 200. The system 100 shown in FIGS. 2 to 4C included a set-top box with the intention that content including results be received from e.g. an external results provider such as a cable or satellite television provider (not shown). In the system 200 of FIG. 5, no set-top box 108 is present. Instead, in this system 200, the functionality provided by the set-top box 108 in system 100 of FIG. 2 is provided by the edge computing device 206. The system 200 may be used, for example, for consensus bets, where the results originate from the user devices 202, 204 located within the low-latency environment 201, rather than relying on an external source such as a satellite or cable television provider.

Specifically, system 200 includes user devices 202, 204, each having installed thereon respective applications 212, 214, which may be the same as the applications 112, 114 as discussed previously. The system 200 also includes the edge computing device 206, which includes a processor 216 and memory 218. It is notable that in the example shown, the edge computing device 206 (and in fact the whole system 200) does not include a trusted clock. This is because a trusted clock is not necessary in a consensus bet, since the results are provided by humans. Of course, in order to modify the system 200 in a manner in which the results can be reliably timestamped, the system, may be modified so that e.g. the edge computing device 206 includes a trusted clock. The trusted clock might also be housed on any of the other components included within the edge computing device 206, and described below.

The processor 216 of the edge computing device 206 includes a results engine 240, which may take the form of any of the results engines 140 shown in FIGS. 3A to 3C, albeit located on an edge computing device 206, rather than a set-top box 108. The processor 216 also includes a smart contract generation module 220, which may take the form of any of the smart contract generation units 120 shown in FIGS. 4A to 4C. The memory 218 of the edge computing device 206 includes a lookup table 226 and a lookup table 242. The functions of these lookup tables 226, and 242 are analogous to the functions of lookup tables 126, and 142, of system 100, respectively—described in detail later. The memory 218 of the edge computing device 206 also includes a local blockchain ledger 222, which is in data communication with the full blockchain residing outside the low-latency environment 201.

Figure 6:
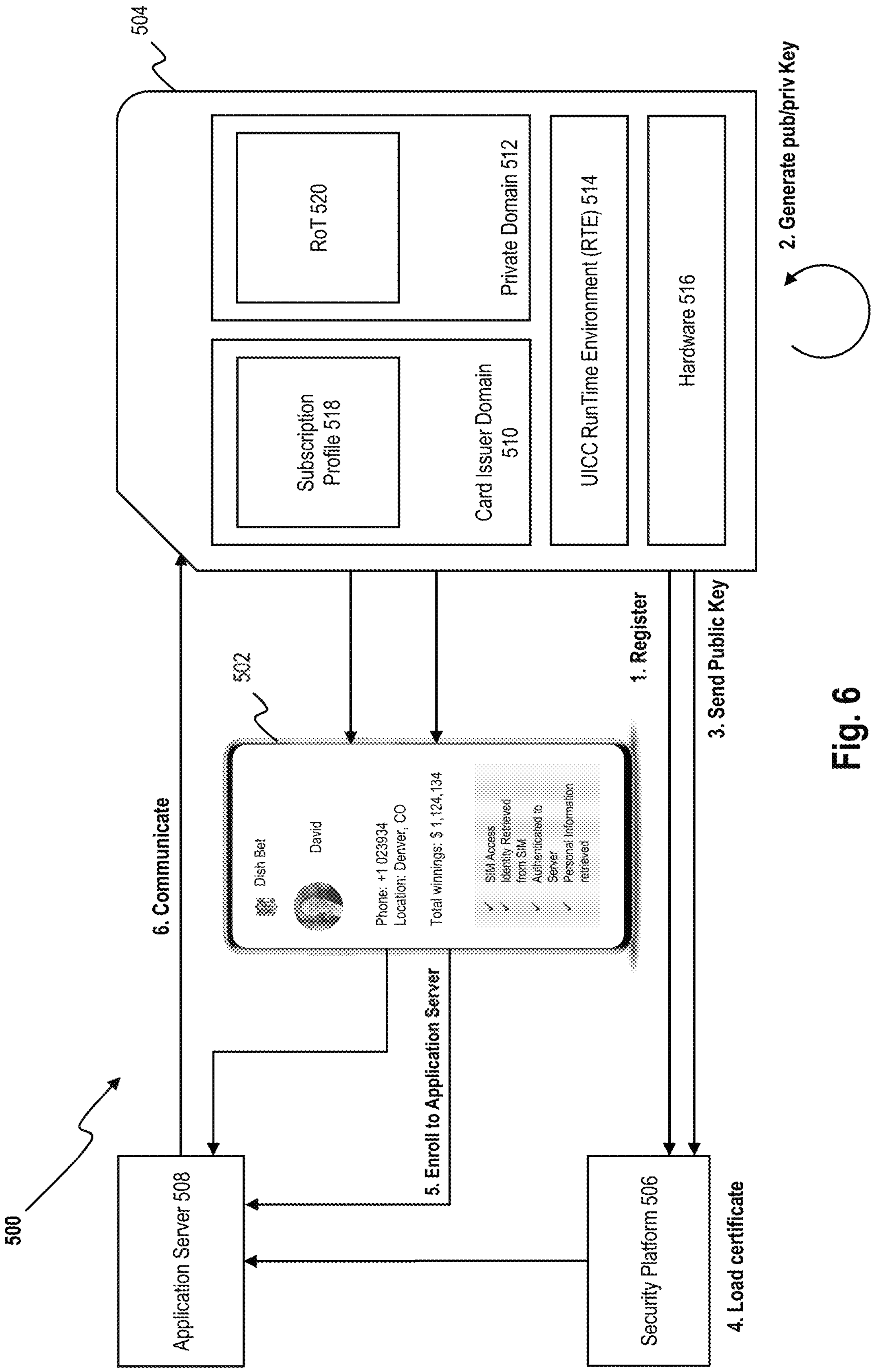
FIG. 6 is a schematic illustrating a process by which an electronic SIM (eSIM) can be leveraged for use with the localized betting system.

For security reasons, before a user is able to use localized betting systems 100, 200, it is preferred that they undergo an authorization process. An example of this authorization process is shown in FIG. 6. The components here will be described, and then the authorization process. Broadly speaking, a user's eSIM is leveraged to operate on the localized betting system 100, 200 of the present invention. Herein, the term "eSIM" is used to refer to an electronic SIM card, as opposed to a physical one. It should be noted, however, that although this application refers only to an eSIM when discussing the authorization process in detail, the principles apply equally well to a conventional, physical SIM card. The authorization system 500 shown in FIG. 6 includes a user device 502, an eSIM 504, which is effectively embedded within the user device 502, although this is not shown in FIG. 6, a security platform 506, and an application server 508 hosted by a cloud computing service, such as AWS (Amazon Web Services). The security platform 506 may be running on the application server 508. It should be noted that there is no requirement here that the components of the authorization system 500 be located within the same low-latency environment as is required for the localized betting system 100, 200 of the present invention. This is because the processes performed by the authorization system 500 take place before a user device e.g. 102, 104, 202, 204 is able to access the localized betting systems 100, 200. The eSIM 504 is partitioned into four main portions: a card issuer domain 510, a private domain 512, a UICC (universal integrated circuit card) RTE (run-time environment) 514, and hardware 516. Here, a subscription profile 518 may be located in the card issuer domain 510, and a root of trust module (RoT) 520 may be located on the private domain 512. The term RoT module refers to a trusted source within a cryptographic system, for example a hardware security module which is configured to generate and protect keys and performs cryptographic functions within a secure environment. Information originating from the RoT module can be treated as authentic and authorized, due to its inaccessibility.

The authorization process is now described. In a first step, a user uses their mobile device 502 to register with the security platform 506. User authentication may also be performed on a local cache of the security platform 506 which is located on an edge computing device such as edge computing devices 106, 206. Then, the eSIM 502 (preferably the RoT module 502 generates a public/private key pair, following which the mobile device 502 transmits the public key only to the security platform 506. The security platform 50 then loads the public key of the local certificate authority into the application server 508, which enables the application server 508 to communicate securely with the eSIM 504 which can decode any communication using the private key, which is not disseminated throughout the system. The user then enrolls with the application server 508, and the eSIM 504 on the mobile device 502 then communicates with the application server 508. The applications 112, 114, 212, 214 are also run on the same application server 508. When a user of the user device 106, 206 places a bet, that bet may be signed with the private key associated with that user, in order to ensure that the wagered funds are transferred by that user. The signature can then be verified at any moment to confirm the user that placed the bet.

Having now described in detail various optional features of the invention, as well as some configurations of components, we now turn to FIGS. 7 to 9B, which relate to the operation of the systems 100, 200. FIGS. 7 to 9A describe a process in which a bet may be placed using the system of FIGS. 2 to 4C, based on e.g. a televised sports game. Then, we describe a process which may be performed on system 200 of FIG. 5, in which a “consensus bet” is placed. It will be appreciated that, where compatible, features of each of the two processes may be incorporated into the other process, without departing from the scope of the disclosure.

FIGS. 7 to 9A illustrate a first betting process which may be performed, for example, by the embodiment of the invention shown in FIGS. 2 to 4C.

Figure 7:
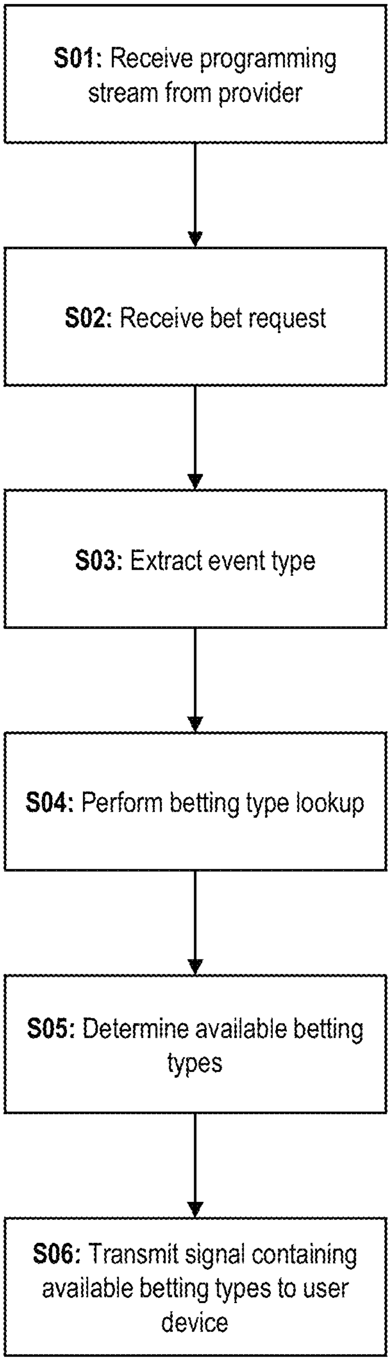

FIG. 7 shows steps S01 to S06. In step S01, a programming stream is received from a provider, such as a cable or satellite television provider. For example, in the embodiment of FIG. 2, the programming stream may be received at the set-top box 108, particularly at a signal receiving module 136 thereof. In other cases, the programming stream may be received from another, external source, for example an online streaming service. It will be appreciated that the programming stream may be received from a range of different external sources without deviating from the invention itself. In embodiments of the invention which do not include a set-top box, it will be apparent that the signal may be received, for example, at an edge device (such as edge devices 106, 206), while still falling within the scope of the invention.

It will be appreciated that a wide variety of bets could be placed on a given sporting event, and the suitable betting types will vary from sporting event to sporting event. More broadly, the types of bet available to a user may differ depending on the type of event on which a bet is to be placed. At this point, in step S02, a bet request may be received from a user device 102, 104. The bet request is generated using the applications 112, 114 installed on the user devices, 102, **104*l*. Here, the bet request represents a request to make a bet, in response to which the user wishes to receive a list of options of bet which can be placed. It may also be referred to as a bet type request. The set-top box 108 may then be configured to determine the available bet types. For example, the set-top box 108 is configured to receive a programming stream from a provider, as discussed above. The programming stream may include metadata including an event indicator, which is a unique identifier of the type of event which forms part of the programming stream. The event indicator may be the same as the event indicator present in the smart contract, and the lookup table. On receipt of the programming stream, the set-top box 108 may be configured to determine the event type based on the event indicator. For example, the set-top box 108 or the results engine 140 thereof may include an event type extraction module (not shown), configured to extract the event type from the programming stream or the metadata included therein. The set-top box 108, preferably a memory 134 thereof, may include a bet type table, the bet type lookup table storing a plurality of event types, and the associated types of bets which are associated with events denoted by those event indicators. An example of a bet type lookup table 1006 is shown in FIG. 11B. It should be noted that this is a single example, and the bet type lookup table may include more than four entries. The event type IDs and bet type IDs may also be designated in a manner other than is shown in FIG. 10. Alternatively, rather than having to perform a lookup, there may already be a predefined set of betting types which are available, which is simply sent to the user. So, in step S04, in response to receiving a request for the available types of bet, the set-top box 108, or a processor 132 of the set-top box 108 may be configured to perform a lookup in the bet type lookup table stored on the memory 134 of the set-top box 108, in order to determine, in step S05, which types of bet are associated with the event currently being broadcast on the set-top box 108. The set-top box 108 may then be configured, in step S06, to transmit a signal to the user device 102, 104, the signal including information about the available betting types. Preferably, the signal is configured to cause the user display the types of bet as a list of selectable options, for example within the software application 112, 114**.

Figure 8:
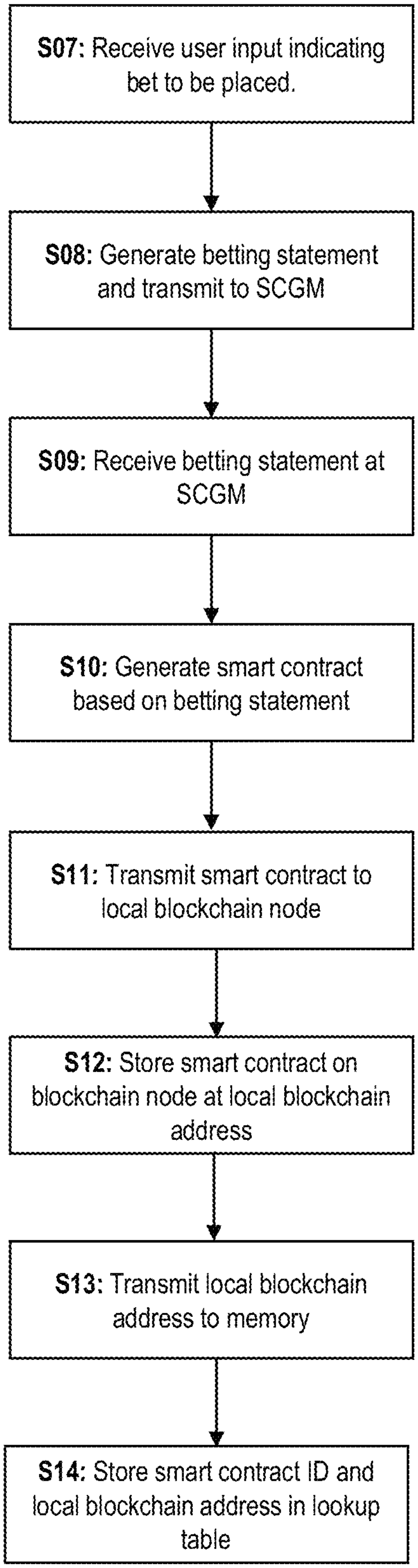

Now, to FIG. 8. In step S07, now that a user is aware of the available bet types, they make some kind of user input into the user device 102, 104. This input, accordingly, is received by the user device 102, 104. In step S08, the user device 102, 104 then generates a betting statement based on the user input, which is transmitted to the smart contract generation module 120. The user device 102, 104, or the application loaded 112, 114 thereon may convert the user input into a betting statement using e.g. a betting statement conversion module 124. Alternatively a metadata extraction module 128 may be used to extract germane information from the user input and thereby to generate a betting statement. In step S09 the betting statement is received at the smart contract generation module 120. A non-limiting example of a betting statement is shown in FIG. 10A. In this example, the information is represented as a form containing various fields, but it should be noted that the betting statement may not actually presented in this manner. The betting statement includes the following fields: Bet ID, User ID, Event ID, Predicted outcome, and Wager. This is a non-exhaustive list of the fields which could be included in a betting statement, and is shown for illustrative purposes only. For example, where the bet is placed between two individuals, the betting statement may include a further field indicating the User ID(s) of other user(s) involved in the bet. In preferred cases, some of the fields, such as the User ID and Bet ID may be automatically populated based on e.g. the user device in question, or the eSIM associated therewith. In other examples, rather than a single “Predicted outcome” field, the betting statement may include a “Bet Type” field (which may include options such as “Winner”, or “Score” for a football match), and then a further field for the Predicted outcome, in which a user either inputs (or selects from a list) the outcome they predict.

In step S10, the smart contract generation module 120, 220 generates a smart contract based on the received betting statement. In some cases, the smart contract generation module 120 may include a betting statement conversion module 124, or a metadata extraction module 128 in order to transform the betting statement into a form from which it is suitable to generate a smart contract. This may be the case, for example, when similar components are not present on the user device 102, 104, and the betting statement is therefore not in the form of a computer-readable message or code. The generated smart contract may have the features described in detail earlier in this application, with reference to FIGS. 1 and 2, and which won't be repeated here, for brevity. An illustrative example of a smart contract is shown in FIG. 10B, where the smart contract is, like the betting statement of FIG. 10A, illustrated in the form of a form having a plurality of fields. In the example shown, the fields are Smart contract ID, Bet ID (to indicate the bet to which the smart contract relates), timestamp (to provide a trusted indicator of the time at which the bet is placed), Wallet ID (corresponding to the User ID, so that the system "knows" how to transfer funds on clearing of the bet. It may be obtained from a lookup table—or alternatively the Wallet ID may be included in the betting statement at the outset), Criterion, and the Action to perform if the criterion is met. Again, this is a non-exhaustive set of fields. The smart contract may also include all of the fields of the betting statement based on which it was generated. However, given that the smart contract includes a Bet ID field, this information may be obtained from a separate lookup if necessary to reduce the size of the smart contract itself. Rather than being represented in the form of a set of fields as in FIG. 10B, it is envisaged that the smart contract will encode the same information in a computer-readable format, such as in code.

It should also be noted that this example may straightforwardly be extended to cover a scenario in which betting statements are received from a plurality of user devices, rather than a single one, also discussed in depth earlier in this application. In step S11, once the smart contract generation module 120 has generated the smart contract, it transmits it to the local blockchain ledger 122, which is located on the edge computing device 106. In step S12, the smart contract is stored on the local blockchain ledger 122 at a local blockchain address. Then, in step S13, the local blockchain address is transmitted to the edge computing device 106, and is stored in step S14 in the lookup table 126 of the memory 118 thereof in associated with a smart contract identifier identifying the generated smart contract. The reason for this is explained later.

At this point, in the process, the users have made their bets, a smart contract has been generated and is stored on a local blockchain ledger 122 of a local blockchain node, located on an edge device 106. FIG. 9 shows the final steps of the process. At step S15, although it may have been ongoing, a programming stream is received, either at the signal receiving module 136 of set-top box 108. In some cases, the set-top box 108 may not include a signal receiving module 136, in which case the programming stream may be received at the results engine 140. In alternative cases, if the system does not include a set-top box 108, the programming stream may be received at an edge computing device 106. At this point, various steps may take place.

In some cases, the programming stream includes raw results data. In such cases, it is necessary to convert the raw results data into meaningful results metadata. In those cases, a results conversion module 144 of the results engine 140 may be used to convert the raw results data into results metadata in a more useful form. Alternatively, the programming stream may include the results metadata already, in which case a results metadata extraction module (not shown) may simply extract this data. It is discussed frequently throughout this application that it is important that the results metadata has an accurate timestamp. This may be achieved in the following ways, for example:

The results conversion module 144 may be add the timestamp based on an input from the trusted clock 138.

The programming stream including the results metadata may already include the timestamp.

The results engine 140 may include a timestamping module 146 which is configured to receive an input from the trusted clock 138 of e.g. the set-top box 108 and to apply a timestamp to the results metadata.

At this point in the process, results metadata including a trusted timestamp has been generated, or otherwise acquired. This results metadata, by definition, includes information indicative of whether the criterion in the smart contract has been met.

In step S15, the results metadata is transferred to the edge device 106. Before this happens, optionally, the volume of the results metadata may be reduced. As discussed earlier in the application, the results metadata may include e.g. an event identifier, an outcome identifier, or a person identifier. A lookup for any or all of these identifiers may be performed in e.g. lookup table 142 or lookup table 126 in order to determine which portions of the results metadata actually pertain to the smart contracts stored in the local blockchain ledger. Only those portions of the results metadata may then be transmitted to the edge device 106. In step S16, it is determined whether the criterion has been met. This may be performed by e.g. a validation module 130, 230 comparing the results metadata with the criterion in the smart contract. At this point, the process may diverge. If it is determined that the criterion in the smart contract has been met, the process proceeds to step S17, where the smart contract self-executes, effecting a transfer of funds or tokens between two users. Then, finally, in step S18, this is replicated or reconciled across the full blockchain, in order to ensure that the transaction is secure. If it is determined that the criterion is not met, the process ends in step S19, without the smart contract self-executing.

Figure 9A:
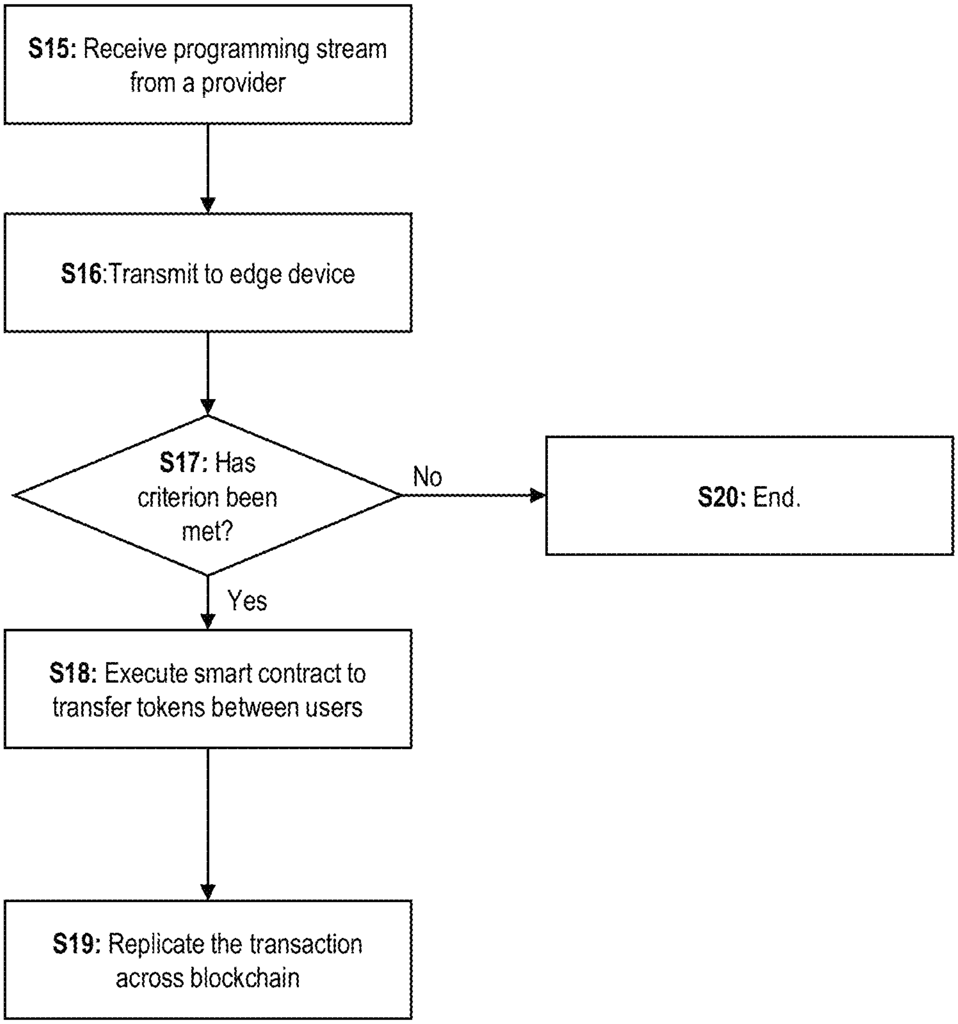
Figure 9B:
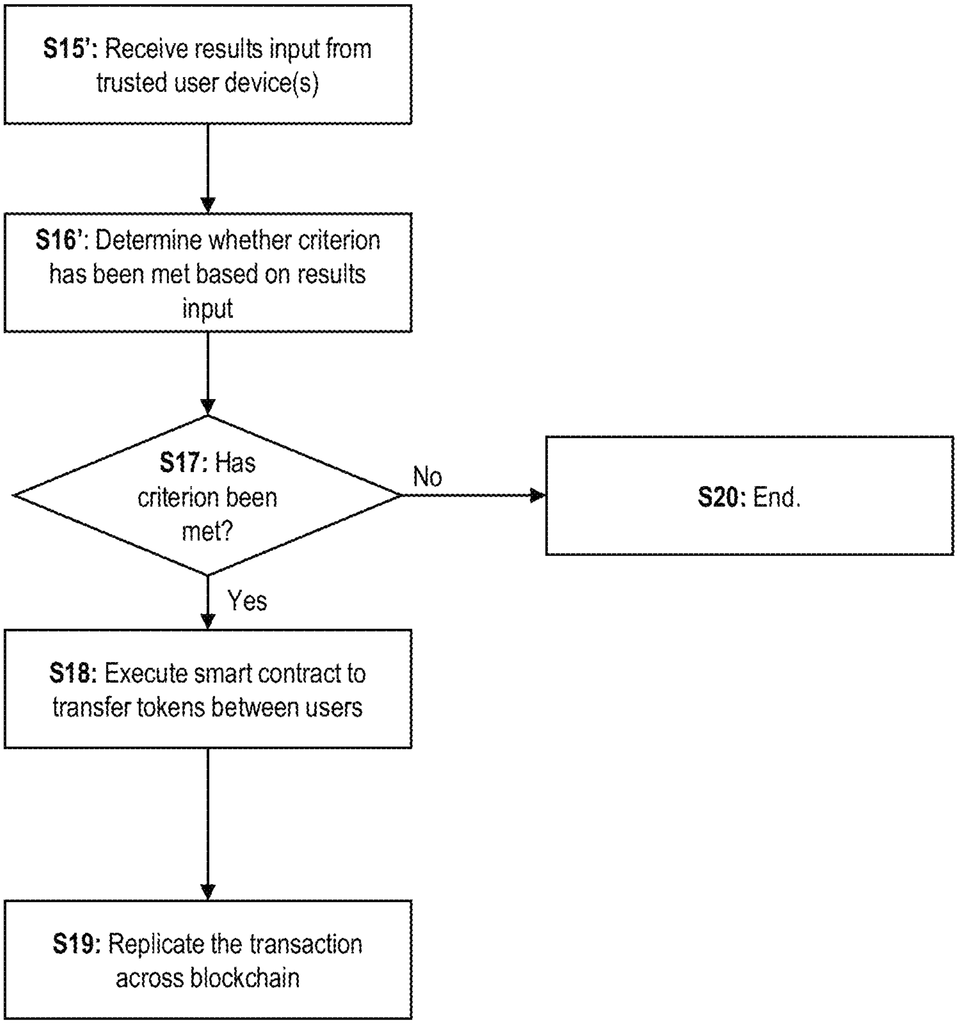
FIG. 9B is a flowchart showing alternative steps to FIG. 9A, which may be used by the system 200 of FIG. 5.

FIG. 9B is a flowchart representing the final stages of a "consensus" betting process, which may be performed on the system 200 of FIG. 5. The process of FIGS. 7 to 9A relate to an arrangement in which the results are based on data received from a trusted source (referred to herein as "broadcast result bets"). However, in some cases, the betting statements may not relate to broadcast events such as televised sporting events. Rather they may be associated with an event for which there is no "official" trusted source. In such cases, it is not possible to rely on an external source to "know" the result, and therefore to arbitrate the bet. In these cases, there may be two options: a user or user device may be nominated as the trusted results source, or the result can be determined by consensus among a large group of users or user devices 202, 204. Accordingly, the results source may include a trusted user device, or preferably a plurality of trusted user devices 202, 204. The placement of the bet may take place in much the same way as shown in steps S07 to S14 of FIG. 8, which won't be repeated here. Because in this instance, the bet may be regarded as "custom", i.e. a user can place any kind of bet they wish, there is no need to perform steps S01 to S06 of FIG. 7, which relate to identifying predetermined betting types available for various types of streamed content.

After step S14 has taken place, a smart contract encoding the user's or users' bet is stored on e.g. the local blockchain ledger 222 on the edge device 206. Then, the betting action takes place—for example, one user may bet another user that they can beat them in a race, or at a game of cards. The betting action as the term is used here refers to any activity which has some kind of "result" which defines the outcome of the betting statement.

Then, in step S15', shown in FIG. 10, the results engine 240 may then be configured to receive a result input from the trusted user device 202 (or a plurality of trusted user devices 202, 204), the result input including information indicative of whether the criterion is met. This is effectively the same mechanism as when the results are received from e.g. a satellite or cable television provider, except the source of the results is a user's input on their user device 202, 204, rather than a programming stream. To avoid the need to rely on an input from a single user, the results source preferably includes a plurality of user devices 202, 204, and the results engine is then preferably configured to receive a respective result input from each of the plurality of trusted user devices 202, 204, each result input including information indicative of whether the criterion is met. In step S16', the results engine 240 may then be configured to determine, based on the plurality of result inputs, whether the criterion has been met. As with the system of FIG. 1A—this determination may take place using validation module 230. In some cases, the results engine 240 or validation module 230 may be configured to determine a proportion of the received results inputs which are indicative of the criterion being met, and comparing this proportion with a threshold, wherein the results engine 240 or validation module 230 determines that the criterion has been met only if the proportion exceeds a predetermined threshold. This ensures that a consensus must be reached before any bet is resolved. Alternatively, the criterion encoded in the smart contract itself may include the proportion of user inputs required for the criterion to be deemed met. For example, the criterion may include the requirement that, say, at least 90% of 10 user inputs indicate that an outcome has taken place, in order for the smart contract to execute. Alternatively, rather than relying on a certain proportion of results inputs, the threshold may be defined in terms of an absolute number of results inputs. In order to preserve the real-time aspect of the betting enabled by the present invention, it is preferred that that trusted user input(s) is (are) located in the same low-latency environment 201 as the smart contract generation module 220 and the results engine 240. It should be noted that the trusted user device 202, 204 or devices 202, 204 may include the user device 202 from which the betting statement is received. The bets described in this paragraph may be referred to as "consensus bets", for brevity. Once the determination in step S16' has taken place, steps S17 onwards are the same as for FIG. 9A.

The betting statement may include information indicating that the bet is to be resolved by consensus (as outlined above) rather than based on "official" results. Alternatively, a processor of the localized betting system, which may be located on e.g. the smart contract generation module, or elsewhere, may be configured to determine whether the betting statement relates to a broadcast result bet or a consensus bet. In the event that it determines that the betting statement relates to a consensus bet, a broadcasting module of the localized betting system, which may be located for example, on the user device which made the bet in the first place, may be configured to send a signal to other user devices within the low-latency environment to inform the users of those devices that their input is sought in resolving a bet. To ensure that the user devices are sufficiently close-by, this signal may be sent via Bluetooth®, or across a Wi-Fi® network. The signal may contain instructions for the receiving user device to display a notification.

What is claimed is:

1. An electronic betting system, the system including:
a smart contract generation module; and
a results engine located in a low-latency environment with the smart contract generation module and a device, wherein the smart contract generation module is configured to:
receive a betting statement from the device via a network, the network including a plurality of edge computing devices connected via a connection, each of the plurality of edge computing devices defining an entry point to the network;
generate a smart contract based on the betting statement, the smart contract including a criterion to be met and configured to self-execute in response to a determination that the criterion is met; and
transmit, via the network, the smart contract to a blockchain node;
wherein the results engine is configured, based on content received from a results source, to determine information indicative of whether the criterion of the smart contract is met; and
wherein the results engine is configured to transmit, via the network, a signal to the blockchain node for storage on a blockchain ledger or a copy of a blockchain ledger, the signal containing the information indicative of whether the criterion is met.

2. The system of claim 1, wherein:
a latency of the low-latency environment is no more than 40 milliseconds (ms).

3. The system of claim 1, wherein:
the electronic betting system further comprises a trusted clock; and
when the smart contract generation module receives the betting statement at a time, it is configured to request a timestamp from the trusted clock, and to include the timestamp in the smart contract.

4. The system of claim 1, wherein:
the device comprises a first device;
the betting statement comprises a first betting statement;
the smart contract generation module is configured to receive a second betting statement from a second device located within the low-latency environment;
the smart contract generation module is configured to generate a smart contract including a first criterion based on the first betting statement, and a second criterion based on the second betting statement; and
the smart contract is configured to self-execute to perform a first action in response to receipt of information that the first criterion has been met, and to perform a second action in response to receipt of information that the second criterion has been met.

5. The system of claim 1, wherein:
the smart contract generation module is configured to store a smart contract identifier in a smart contract lookup table in association with an event identifier;
the results engine is configured to receive results in the form of results metadata, or the results engine includes a results conversion module which is configured to convert the content received from the results source into results metadata, the results metadata including a results event identifier;

the electronic betting system is configured to perform a lookup in the smart contract lookup table, in order to determine whether any results event identifier in the results metadata corresponds to any smart contract identifier in the smart contract lookup table; and in the event that it is determined that the results metadata does include event identifiers which correspond to at least one smart contract identifier in the smart contract lookup table, the results engine is configured to transmit only a subset of the results metadata which corresponds to the at least one smart contract identifier in the smart contract lookup table.

6. The system of claim 1, wherein:

the electronic betting system further comprises a set-top box which comprises the results engine;

the set-top box is configured to receive cable or satellite television signals, and to render the cable or satellite television signals into a format which is viewable on a television; and the results engine is configured to receive the content from a cable or satellite television provider.

7. The system of claim 6, wherein:

the set-top box is configured to receive a programming stream, the programming stream including metadata including an event indicator, which is a unique identifier of a type of event which forms part of the programming stream; and on receipt of a bet type request from a device, the set-top box is configured to perform a lookup in a bet type lookup table in order to determine which types of bet are associated with the event indicator, and to transmit a signal to the device, the signal including information about associated bet types.

8. The system of claim 1, wherein the device, the smart contract generation module, and the results engine are all part of a same sub-network, the sub-network including a subset of devices on the network, wherein the subset of devices is configured to access the network via the same entry point.

9. The system of claim 1, wherein the betting statement describes a person-to-person bet.

10. The system of claim 1, wherein the betting statement describes a pool bet.

11. The system of claim 1, wherein the betting statement describes a person-to-house bet.

12. The system of claim 1, wherein the results engine is configured to reconcile the blockchain ledger or the copy of the blockchain ledger with a public ledger.

13. A electronic betting system, the system including:

a smart contract generation module; and a results engine located in a low-latency environment with the smart contract generation module and a device, wherein the smart contract generation module is configured to:

receive a betting statement from the device;

generate a smart contract based on the betting statement, the smart contract including a first criterion to be met and a second criterion to be met, wherein the smart contract is configured to self-execute to perform a first action in response to a determination that the first criterion is met, and to self-execute to perform a second action in response to a determination that the second criterion is met; and transmit the generated smart contract to a blockchain node located within the low-latency environment;

wherein the results engine is configured, based on content received from a results source, to determine information indicative of whether at least one of the first criterion or the second criterion of the smart contract is met; and wherein the electronic betting system is configured to transmit a signal to the blockchain node for storage on a blockchain ledger or a copy of a blockchain ledger, the signal containing the information indicative of whether at least one of the first criterion or the second criterion is met.

14. The system of claim 13, wherein:

a latency of the low-latency environment is no more than 40 milliseconds (ms).

15. The system of claim 13, wherein:

the electronic betting system further comprises a trusted clock; and when the smart contract generation module receives the betting statement at a time, it is configured to request a timestamp from the trusted clock, and to include the timestamp in the smart contract.

16. The system of claim 13, wherein:

the smart contract generation module is configured to store a smart contract identifier in a smart contract lookup table in association with an event identifier;

the results engine is configured to receive results in the form of results metadata, or the results engine includes a results conversion module which is configured to convert the content received from the results source into results metadata, the results metadata including an event identifier;

the electronic betting system is configured to perform a lookup in the smart contract lookup table, in order to determine whether any results event identifier in the results metadata corresponds to any smart contract identifier in the smart contract lookup table; and in the event that it is determined that the results metadata does include any results event identifier which corresponds to any smart contract identifier in the smart contract lookup table, the results engine is configured to transmit only a subset of the results metadata which corresponds to one or more smart contract identifiers in the smart contract lookup table.

17. The system of claim 13, wherein:

the electronic betting system further comprises a set-top box which comprises the results engine;

the set-top box is configured to receive cable or satellite television signals, and to render the cable or satellite television signals into a format which is viewable on a television; and the results engine is configured to receive the content from a cable or satellite television provider.

18. The system of claim 17, wherein:

the set-top box is configured to receive a programming stream, the programming stream including metadata including an event indicator, which is a unique identifier of a type of event which forms part of the programming stream; and on receipt of a bet type request from a device, the set-top box is configured to perform a lookup in a bet type lookup table in order to determine which types of bet are associated with the event indicator, and to transmit a signal to the device, the signal including information about associated bet types.

19. The system of claim 13, wherein the betting statement describes a person-to-person bet.

20. The system of claim 13, wherein the betting statement describes a pool bet.

21. The system of claim 13, wherein the betting statement describes a person-to-house bet.

* * * * *